(12) United States Patent
     Chevalier

(10) Patent No.: US 11,376,652 B2
(45) Date of Patent: Jul. 5, 2022

(54) METHOD AND APPARATUS FOR SUPPLYING AND FIXING SNAP CONNECTORS

(71) Applicant: Textiles Patlin inc., Saint-Paulin (CA)

(72) Inventor: Patrice Chevalier, St-Paulin (CA)

( * ) Notice: Subject to any disclaimer, the term of this patent is extended or adjusted under 35 U.S.C. 154(b) by 0 days.

(21) Appl. No.: 16/951,951

(22) Filed: Nov. 18, 2020

(65) Prior Publication Data
     US 2021/0187590 A1    Jun. 24, 2021

Related U.S. Application Data

(60) Provisional application No. 62/937,477, filed on Nov. 19, 2019.

(51) Int. Cl.
    *B21J 15/32*    (2006.01)
    *B21J 15/14*    (2006.01)
    (Continued)

(52) U.S. Cl.
     CPC .............. *B21J 15/32* (2013.01); *A47H 13/14* (2013.01); *B21J 15/14* (2013.01); *B23P 19/002* (2013.01); *B23P 19/004* (2013.01); *B23P 19/006* (2013.01); *D03D 1/06* (2013.01); *A47H 13/00* (2013.01); *A47H 15/04* (2013.01)

(58) Field of Classification Search
     CPC ........ A47H 13/00; A47H 15/02; A47H 15/04; A41H 37/04; B21J 15/14; B21J 15/32; B23P 19/002; B23P 19/004–005; B23P 19/006; B65G 47/1407–1442; B65G 47/1457
     See application file for complete search history.

(56) References Cited

U.S. PATENT DOCUMENTS

| 1,839,176 A | * | 12/1931 | Pierce | ..................... A41H 37/04 227/116 |
| 2,028,704 A | * | 1/1936 | Hayden | .................. A41H 37/04 221/123 |

(Continued)

FOREIGN PATENT DOCUMENTS

| DE | 3820989 A1 * 12/1989 | ............. A47H 13/00 |
| WO | 1993009918     5/1993 | |

(Continued)

*Primary Examiner* — Matthew P Travers
(74) *Attorney, Agent, or Firm* — Benoit & Cote Inc.; Charles-André Caron

(57) ABSTRACT

A system and method for feeding and fixing snap connectors of a ripple fold curtain system, in which a drum mixes loose snap connectors, successively introduced individually in an opening in the drum for letting one of the snap connectors out. The orientation of the one of the snap connectors is forced by having the opening have a height smaller than the width of the snap connectors. After travelling while maintaining their orientation aligned with motion, each snap connector is received in the same orientation at a receptacle comprising shoulders for retaining a larger portion of the one of the snap connectors, the receptacle retaining it at a definite location and maintaining the orientation. A rivet is positioned on that larger portion of the snap connector and snapped using a hammer of which the surface is parallel with the snap connector and underlying receptacle bottom surface.

11 Claims, 20 Drawing Sheets

(51) Int. Cl.
*B23P 19/00* (2006.01)
*A47H 15/04* (2006.01)
*A47H 13/14* (2006.01)
*D03D 1/06* (2006.01)
*A47H 13/00* (2006.01)

(56) References Cited

U.S. PATENT DOCUMENTS

| | | | |
|---|---|---|---|
| 2,689,667 A * | 9/1954 | Thompson | B65G 47/1428 221/170 |
| 3,265,273 A * | 8/1966 | Janus | B65G 47/1407 227/2 |
| 3,602,418 A * | 8/1971 | Erhardt, Jr. | A41H 37/00 227/3 |
| 3,750,925 A * | 8/1973 | Schmidt | A41H 37/04 227/116 |
| 4,007,537 A * | 2/1977 | Silverbush | A41H 37/04 29/432.1 |
| 4,014,488 A | 3/1977 | Potucek et al. | |
| RE33,781 E | 12/1991 | Bateman | |
| 5,779,127 A | 7/1998 | Blacket et al. | |
| 5,964,393 A | 10/1999 | Feldpausch et al. | |
| 6,182,739 B1 | 2/2001 | Jones | |
| 6,574,856 B2 | 6/2003 | Raccosta et al. | |
| 6,592,015 B1 | 7/2003 | Gostylla et al. | |
| 6,662,953 B1 * | 12/2003 | Rouse | B65D 88/70 209/682 |
| 7,048,168 B2 | 5/2006 | Wargel | |
| 8,910,697 B1 | 12/2014 | Dollahan | |
| 9,717,362 B1 | 8/2017 | Birch | |
| 2012/0145860 A1 | 6/2012 | Ruffo et al. | |
| 2014/0260925 A1* | 9/2014 | Beach | F42B 5/307 86/28 |
| 2015/0159430 A1 | 6/2015 | Huang | |
| 2018/0133931 A1 | 5/2018 | Sho et al. | |
| 2019/0231109 A1 | 8/2019 | Mullet et al. | |
| 2020/0196790 A1* | 6/2020 | Ko | A47H 1/06 |

FOREIGN PATENT DOCUMENTS

| | | |
|---|---|---|
| WO | 2011058297 | 5/2011 |
| WO | 2011097680 | 8/2011 |

* cited by examiner

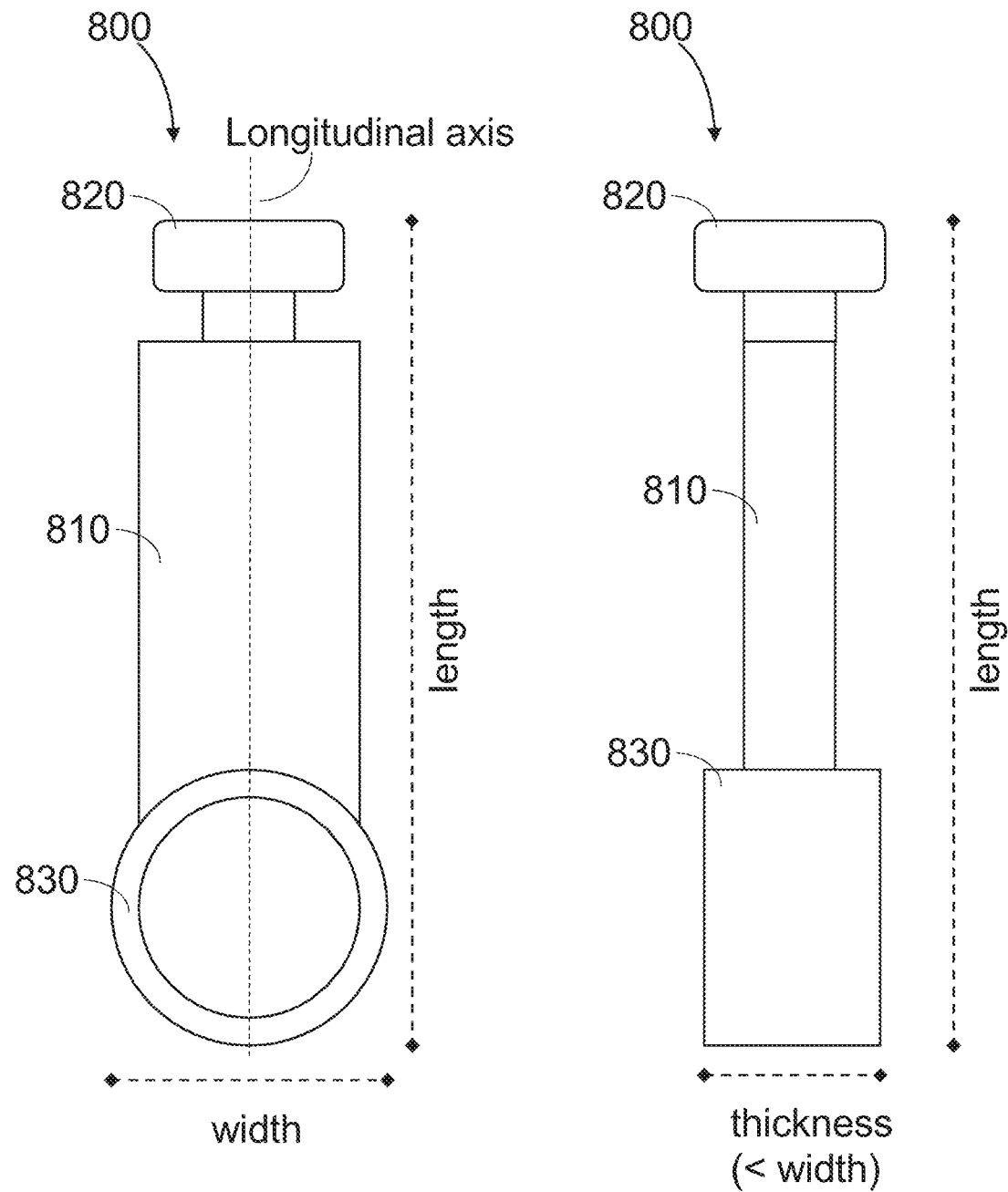

DETAIL D

METHOD AND APPARATUS FOR SUPPLYING AND FIXING SNAP CONNECTORS

CROSS-REFERENCE TO RELATED APPLICATIONS

This application claims benefit from U.S. patent application 62/937,477, filed Nov. 19, 2019, the specification of which is hereby incorporated herein by reference in its entirety.

BACKGROUND

(a) Field

The subject matter disclosed generally relates to curtain systems. More specifically, it relates to an apparatus and method for feeding and fixing snap connectors of a ripple fold curtain system to automate the manufacturing process thereof.

(b) Related Prior Art

There is a type of curtains referred to as "ripplefold" or "ripple fold" curtains, characterized by rivets fixed on an upper border of the piece of fabric forming the curtain. Wheeled connectors are then snapped onto corresponding rivets, and the upper wheel of the wheeled connector is then inserted into a rail to be installed on the wall or ceiling above the window.

An example of such a system is described and illustrated in WO 2011/097680 A1, incorporated herein by reference. FIG. 1 shows an exemplary rippled fold curtain system, in which a textile band 700, which can be an upper portion of the curtain or a band to be sewed to the curtain, is riveted with rivets 750. The rivets 750 are typically installed with a dedicated apparatus for riveting. Typically, the rivets 750 are intended to receive another element using a snap-fit connector, the rivet 750 being the female (or male) part and the other element being the cooperating male part (or female part, respectively) that can be snapped thereto to hold the curtain in place.

Typically, each snap connector 800 is manually snapped onto the rivet to arrive at the result of FIG. 1. The plurality of snap connectors are then arranged onto a line or in a rail to allow lateral displacement of the snap connectors.

SUMMARY

According to an aspect of the invention, there is provided an apparatus for feeding and fixing snap connectors of a ripple fold curtain system, each of the snap connectors having a length, a width smaller than the length, and a thickness smaller than the width, the apparatus comprising:
- a drum for receiving the snap connectors, which are loose therein, the drum being rotatable for mixing the snap connectors and comprising an opening for letting one of the snap connectors out, the opening having a height smaller than the width of the snap connectors to force an orientation to the introduction of the one of the snap connectors through the opening; and
- a receptacle receiving the one of the snap connectors introduced through the opening, the receptacle comprising shoulders for retaining a larger portion of the one of the snap connectors, the shoulders comprising therebetween a neck of a width smaller than the larger portion of the one of the snap connectors for receiving an elongated portion of the one of the snap connectors which extend further than the larger portion thereof, the receptacle retaining the larger portion of the one of the snap connectors at a definite location for snapping.

According to an embodiment, there is further provided a channel having a height smaller than the width of the snap connectors and having a width smaller than a length of the snap connectors to keep the orientation from the introduction of the one of the snap connectors through the opening and further maintain the one of the snap connectors vertically inside the channel.

According to an embodiment, the receptacle is formed at a bottom of the channel.

According to an embodiment, the channel is long enough for containing a plurality of snap connectors forming a queue, further comprising a sensor for detecting a length of a queue and instructing an operation of the drum based on the sensor detecting the length of the queue.

According to an embodiment, the drum is a cylinder and the opening is formed on a circumference of the cylinder.

According to an embodiment, the opening has a width and a height which are smaller than the length of the snap connector and larger than the width and the thickness of the snap connector.

According to an embodiment, there is further provided a wall on a circumference of the cylinder which is immediately adjacent the opening.

According to an embodiment, the wall has a radial depth toward an inside center of the drum which is between one and three times the length of the snap connector, and a longitudinal height along a cylindrical axis-of-rotation direction of the drum which is between one and three times the length of a snap connector, and greater than the height of the opening.

According to an embodiment, there is further provided a hammering surface opposed to the receptacle, the hammering surface being parallel to a general orientation of the receptacle to perform hammering perpendicularly to the snap connector therein.

According to another aspect of the invention, there is provided a method for feeding and fixing snap connectors of a ripple fold curtain system, each of the snap connectors having a length, a width smaller than the length, and a thickness smaller than the width, the method comprising the steps of:
- mixing in a drum the snap connectors, which are provided loose therein;
- providing an opening in the drum for letting one of the snap connectors out;
- forcing an orientation to the introduction of the one of the snap connectors through the opening by having the opening have a height smaller than the width of the snap connectors; and
- receiving the one of the snap connectors in the orientation at a receptacle comprising shoulders for retaining a larger portion of the one of the snap connectors, the receptacle retaining the larger portion of the one of the snap connectors at a definite location for snapping and maintaining the orientation.

According to an embodiment, there is further provided the step of directing the one of the snap connectors from the opening into a channel, wherein the receptacle is formed at a bottom of the channel.

According to an embodiment, the shoulders comprise therebetween a neck of a width smaller than a width of the channel for receiving an elongated portion of the one of the snap connectors which extend further than the larger portion thereof.

According to an embodiment, there is further provided the step of forcing an orientation of the one of the snap connectors aligned with a motion of the one of the snap connectors when travelling through the channel by having the channel have a height smaller than the width of the snap connectors and having a width smaller than a length of the snap connectors to keep the orientation from the introduction of the one of the snap connectors through the opening and further maintain the one of the snap connectors vertically inside the channel.

According to an embodiment, there is further provided the step of queuing a plurality of snap connectors in the channel, monitoring a queue and operating the drum based on the monitoring of the queue.

According to an embodiment, there is further provided the step of snapping the one of the snap connectors in the receptacle by a hammering the snap connector at a definite location above the shoulder, the hammering being performed perpendicularly to the channel.

BRIEF DESCRIPTION OF THE DRAWINGS

Further features and advantages of the present disclosure will become apparent from the following detailed description, taken in combination with the appended drawings, in which:

FIG. 2 is a front or rear view illustrating a snap connector, according to an exemplary embodiment of the invention;

FIG. 3 is a side view illustrating the snap connector of FIG. 2;

It will be noted that throughout the appended drawings, like features are identified by like reference numerals.

DETAILED DESCRIPTION

Figure 1:
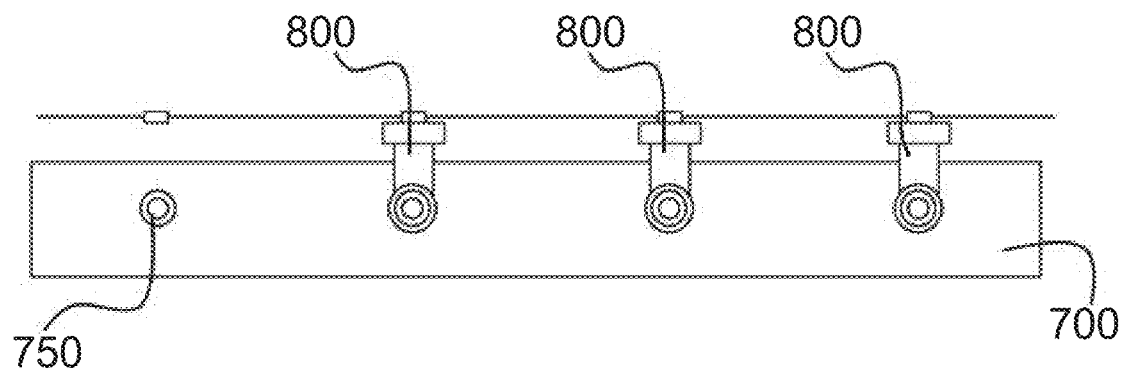
FIG. 1 is a side view illustrating a rippled fold curtain system, according to the present state of the art.
Figure 4:
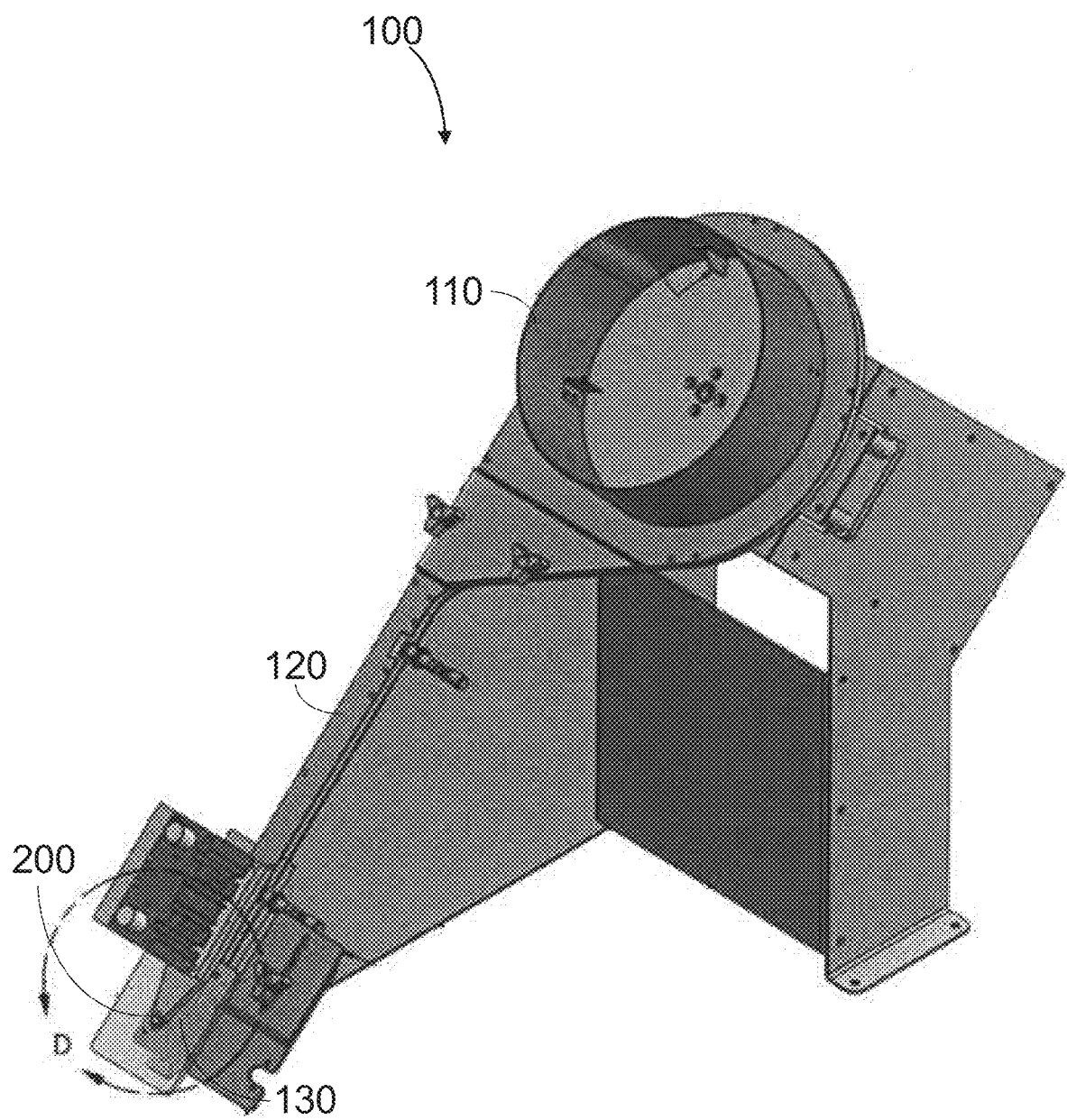
FIG. 4 is a front perspective view illustrating an apparatus for feeding and fixing snap connectors of a ripple fold curtain system, according to an exemplary embodiment of the invention.
Figure 5:
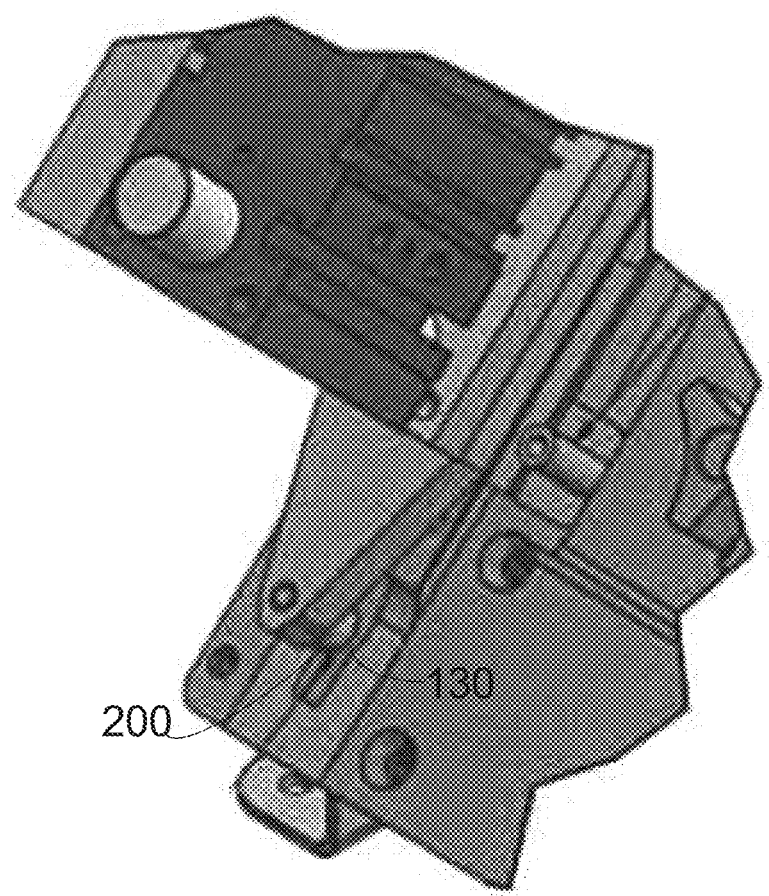
FIG. 5 is a close-up view illustrating the hammering surface and receptacle of the apparatus of FIG. 4.

There is described an apparatus for feeding or supplying snap connectors in an automated manner, and consecutively to the feeding operation, for fixation to a rivet (or to any other equivalent cooperating element) on a piece of textile, again in an automated manner.

The snap connector 800 has a particular shape which implies that current component suppliers (i.e., the machines that mechanically supply other types of components for fixation in a manufacturing setting) would not be suitable for the distribution of the snap connector 800 in an automated manner. There is therefore described a dedicated machine that mechanically supplies snap connectors 800 and secures them onto corresponding curtain rivets in a manufacturing setting.

More specifically, as shown in FIGS. 2-3, the snap connector 800 comprises an elongated portion 810 forming the body of the snap connector, extending in greater length in a particular direction (the "length" of FIGS. 2-3), thereby defining the longitudinal axis of the snap connector 800. The "length" of FIGS. 2-3 indicates the direction of the longitudinal axis. The elongated portion 810 is typically rather flat, thereby defining a longitudinal plane comprising the longitudinal axis corresponding to the general plane formed by the elongated portion 810 if it is substantially flat (i.e., thickness smaller than the width). For example, the rectangular surface of the elongated portion 810 shown in a front view in FIG. 2 is flat and defines said longitudinal plane.

At one end (i.e., top end) of the elongated portion 810, a wheel 820 is provided. The wheel 820 may be simply a circular portion, and is to be fitted within a rail arrangement for sliding the upper portion of the curtain. According to an embodiment, the wheel 820 has a rotation axis which is the longitudinal axis of the snap connector 800 defined by the length of the elongated portion 810 thereof and traversing the center of the wheel 820. This implies that the wheel 820 is in a plane, which can be referred to as the transverse plane, or wheel plane, which is perpendicular to the length of the longitudinal axis of the snap connector 800 defined by the length of the elongated portion 810 thereof (i.e., the longitudinal axis is normal to the transverse plane), and therefore also perpendicular to the longitudinal plane parallel to the larger, front surface of the elongated portion 810.

At the other end (i.e., bottom end) of the elongated portion 810, opposite the wheel 820, there is a snap member 830. The snap member 830 is either a male or a female portion that enters in a snap-fit relationship with the opposite cooperating portion riveted onto a curtain or band of textile. The snap member 830 has a front surface (or rear surface as it should be reversible) which generally extends in a plane parallel to the longitudinal axis. Preferably, it should extend parallel to the longitudinal plane of the elongated portion 810, as defined above (i.e., extend along the same plane, that is the longitudinal plane).

Typically, the snap member 830 is the largest portion of the snap connector 800, and therefore defines the overall width of the snap connector 800. The greatest dimension of the snap connector 800 is, however, its length, which is measured along the longitudinal axis defined above (i.e., the length is greater than the width).

Typically, the wheel 820 of the snap connector 800 may be smaller than as shown in the FIG. 1 showing a state-of-the-art ripple fold curtain system. Advantageously, the wheel is small, and may be simply a circular portion at the top of the snap connector, as shown in FIGS. 2-3. This means that the thickness of the snap connector 800 is the smallest of its dimensions (i.e., the thickness is smaller than the width, which is smaller than the length). The length (measured as the whole end-to-end length, from the top end to the bottom end including the wheel 820 and the snap member 830, along the longitudinal axis defined by the axis of the elongated portion 810) is the greatest dimension, the width is the outside diameter of the snap member 830 in the axis perpendicular to the length, and the thickness is defined in the axis perpendicular to the two others. The thickness may be measured as the greatest measurements among the following: thickness of the snap member 830 (i.e., height of the cylinder forming the snap member 830), thickness of the elongated portion 810 or thickness of the wheel 820.

The apparatus described below aims to repeatedly distribute a single snap connector 800 taken from a source of a plurality of snap connectors in bulk, and takes advantage of the length of each snap connector being longer than the width to force a distribution of snap connectors, only one at a time, and distributed in a vertical orientation at the end of the step of distribution to allow the next step of automated snapping, which involves a proper fixation of said single snap connector in vertical orientation onto the corresponding rivet on a piece of fabric (such as a curtain). The thickness and width should also be different to ensure that the apparatus can discriminate both in order to supply the snap connectors in the right orientation for the eventual automated snapping.

Now referring to FIGS. 4-10, there is shown the apparatus 100 for sequentially feeding individual snap connectors 800 and snapping them onto corresponding individual rivets, the apparatus 100 comprises a drum 110 acting as a reservoir of a plurality of snap connectors, in bulk, to be supplied. Advantageously, the plurality of loose snap connectors initially provided can be dumped into the reservoir, as they will be put individually under the right orientation later, when individually distributed in view of eventual snapping. The drum 110 is a container, preferably enclosed, installed in combination with an engine or any other mechanism comprising actuators that can provide a rotation, or a series of partial rotations, or a significant vibration of the container.

According to an embodiment, the drum 110 is a cylinder which is installed horizontally such as to spin about a spinning axis which is substantially horizontal, thereby mixing the snap connectors 800 which are contained therein and are periodically brought by gravity to the bottom thereof, providing the mixing operation.

At the bottom of the drum 110, or on the periphery of the drum, there is provided an opening 115 toward a channel 120. The channel 120 is a downward channel, in which a snap connector 800 entering from the top (i.e., from the opening 115) will be forced to fall under the effect of gravity.

According to an embodiment, the drum 110 has an enclosure 111, the drum 110 being installed within the enclosure 111. The drum 110 (i.e., the cylinder) may comprise one or more openings 115 which are large enough to let snap connectors therethrough, preferably only one snap connector for individual distribution of snap connectors, i.e., one individual snap connector at a time and no other at the same time. If there is more than one opening, as shown very explicitly in FIG. 8, they should preferably be distant such that while the drum 110 is in operation, the bulk of loose snap connectors can only fall in one of the openings 115 at a time, to ensure individual feeding. The enclosure 111 has the opening 115 provided thereon, such that when a plurality of snap connectors in the drum 110 fall onto the opening 115, only one of the snap connectors is able to cross the opening 115 at a given time and thereby leave the drum 110 and enter the channel 120 in an individual manner through the funnel of the enclosure 111. A plurality of other individual distribution follow in a sequential manner.

The opening 115 may comprise a small wall 116 which eases the introduction of one snap connector 800 when a plurality of them are being mixed, and preferably precedes the opening 115 when the drum 110 is in rotation, to better mix the snap connectors and push them away from the opening 115 such that those that are hit by the small wall 116 when the drum 110 is in rotation swing over the opening and slide back into it. The small wall 116 is shown as a well-defined wall secured to the inner surface of the cylindrical drum 110 and extending perpendicularly therefrom (i.e., radially) toward the inside, the small wall 116 having a radial depth toward the inside center of the drum 110 which is between one and three times the length of a snap connector, and having a longitudinal height along the cylindrical axis-of-rotation direction which is between one and three times the length of a snap connector, and greater than the height of the opening 115 (which is smaller than the length of a snap connector). The small wall 116 may therefore be a rectangle, which can also be a square if height and depth are similar. The small wall 116 may comprise a perpendicular base (perpendicular to the small main portion of the small wall 116) which is secured (e.g., screwed, bolted, welded, snapped, glued or any other means of securing it) to the inner surface of the drum 110. The thickness of the main portion of the small wall is preferably smaller than the snap connector's width. Alternatively, the small wall 116 could be a linear bump on the inner surface extending in an axis-of-rotation direction, with similar dimensions but formed as a bump (or protuberance) instead of a well-defined wall.

With the small wall 116 adjacent the opening 115, when the snap connector 800 slides toward the opening 115, it has greater probability of continuing its movement through it.

The opening 115 should have a width (defined along the transverse direction, i.e., along the circumference of the cylindrical drum 110) and height (defined along the longitudinal axis, i.e., parallel to the axis of rotation of the cylindrical drum 110) which are smaller than the length of the snap connector 800 to have it enter longitudinally through the opening 115. the drum 110 has a bottom surface on which the loose connectors lie, and the opening 115 on the circumference of the cylinder (curved side) preferably reaches the edge that the cylinder side forms with the bottom surface. The height of the opening should be at least as large as the thickness of a snap connector 800 (to allow its passage), and smaller than the width of the snap connector 800 to prevent any passage in the wrong orientation. The width of the opening should be at least as large as the width of a snap connector 800 to allow its passage, which will necessarily be in the right orientation thanks to the previously mentioned constraints. The dimensions of the opening 115 therefore put significant constraints on the orientation in which a given, individual snap connector can penetrate thereinto, but the high number of loose snap connectors in bulk in the drum 110 and the mixing effect of the small wall 116 which is in motion within the inside of the drum 110 both ensure that one of them penetrates into one of the openings 115 in a sequential and repeated manner, successively and individually.

Downstream of the opening 115, the channel 120 is defined by side walls (left side wall 121, right side wall 122) which define a width of the channel 120, and a front wall 123 and rear wall 124 which define a thickness of the channel 120.

The width and the thickness of the channel 120 both need to be larger than the snap member 830 of the snap connector 800 (which is the largest portion of the snap connector 800), otherwise the snap connector 800 may not be able to fit within the channel 120.

According to an embodiment, the width and the thickness of the channel 120 also need to be smaller than the length of the snap connector 800. This requirement prevents the snap connector 800 to enter the channel not vertically, i.e., it ensures that the snap connector 800 has a substantially vertical orientation within the channel 120.

The "vertical orientation" that the snap connector 800 can include a strict vertical orientation where the longitudinal axis of the snap connector 800 is aligned or substantially aligned with the vertical, and the motion of the snap connector 800 is also along the vertical. The "vertical orientation" can include an inclined orientation having a significant vertical component. The required angle, which can be about 45° or anywhere between 45° and the vertical (90°), is an angle which allows the snap connector 800 to slide downward an inclined plane by its own weight, and therefore the minimal angle of inclination (more or less 45°) depends on the coefficient of dynamic friction between the snap connector 800 and such an inclined surface which would allow the snap connector 800 to keep sliding downwardly on said inclined surface under the effect of its own weight.

More generally, the "vertical orientation" may also be replaced by any orientation in which the direction of motion of the snap connector 800 is aligned with the longitudinal axis of the snap connector 800. Since gravity, i.e., the weight of the snap connector 800, is the main driver of the motion of the snap connector 800, this means that a vertical orientation is in the natural orientation in which the direction of motion of the snap connector 800 is aligned with the longitudinal axis of the snap connector 800. However, should there may any additional force driving the motion of the snap connector 800, e.g., a conveyor, a treadmill, etc., then the necessary orientation may not be vertical, and it may be any orientation in which the direction of motion of the snap connector 800 is aligned with the longitudinal axis of the snap connector 800, as mentioned above. This includes an inclined orientation when the snap connector 800 is driven by its own weight but is sliding on an inclined surface sufficiently inclined to allow sliding thereof.

To ensure that the substantially vertical orientation within the channel 120 is vertical, preferably, or more generally to ensure that the direction of motion of the snap connector 800 is aligned with the longitudinal axis of the snap connector 800, the width of the channel 120, which needs to be larger than the width of the snap member 830, should be only slightly larger than the width of the snap member 830, i.e., it needs to be greater, but also needs to be not significantly greater than the width of the snap member 830, for example greater than the width of the snap member 830 and smaller than the length of the snap member 830.

Doing this ensures that the snap member 830 of a given snap connector 800 occupies most of the width of the channel 120, forcing the elongated portion 810, or body of the snap connector 800, to extend vertically, or more generally to ensure that the direction of motion of the snap connector 800 is aligned with the longitudinal axis of the snap connector 800, by having the snap connector 800 fall into the channel 120 either with the wheel 820 first, or with the snap member 830 first. The result is that the snap connector 800 travels within the channel 120 and reaches the bottom thereof (where it will eventually be taken away) while remaining in a vertical orientation or otherwise with the direction of motion of the snap connector 800 aligned with the longitudinal axis thereof.

Furthermore, to ensure that the snap member 830 always comprises the snap member 830 in the same orientation (first or last) when arriving at the bottom of the channel 120, the channel 120 should have a thickness greater than the thickness of the snap connector 800, and smaller than the width of the snap connector 800. This discrimination of the orientation of the snap connector 800 may be done from the opening 115 and maintained by ensuring that the front and rear walls 123, 124 are always present and maintain the desired orientation. Therefore, the snap member 830, whether it is located at the top or at the bottom of the snap connector 800, will always have its diameter in the plane defined by the width, and never perpendicular thereto. Since the snap member 830 is usually reversible, it will offer one of its surface toward the front in order to undergo snapping at the end of the channel 120.

According to an embodiment, the opening 115 opens onto an inside of the enclosure 111 having walls in the lower part thereof forming a shape of a funnel, comprising at least one inclined surface 118. The requirements for the sizing of the channel 120 are therefore obtained in a smooth manner by ensuring that the opening 115 at the top of the channel 120 starts with larger dimensions, which reduce to reach the specific sizing in both directions (width, thickness).

According to an embodiment, as shown in FIGS. 8 and 11-13, the opening 115 opens toward the inside of the enclosure and falls onto an inclined surface 118 forming the funnel. The inclined surface receives a snapconnector 800 that has fallen through the opening 115 and lets the snap connector 800 slide onto the inclined surface 118 downwardly to formally enter the channel 120 at the bottom of the inclined surface 118. This inclined surface 118 needs to have a vertical component to allow the snap connector 800 to keep going by gravity (if gravity is the main driver of motion of the sliding or falling snap connector 800, otherwise it needs to follow the direction of motion of said driving force which could be a conveyor or the like) but is long enough and has a significant horizontal surface to ensure that the snap connector 800 falling thereon will lay onto the inclined surface and slide therealong. To lay onto the inclined surface means that the longitudinal axis of the snap connector 800 is parallel with the inclined surface; i.e., it is strictly vertical, but inclined, and still with a significant vertical component to allow weight-driven sliding. This means that the snap connector 800 will actually slide along the inclined surface 118 and, when it reaches the bottom thereof to enter the channel 120, it will enter by one of its two ends. This prevents the snap connector 800 from reaching the channel 120 by being perpendicular to the desired orientation for entry, in which case it would block the channel 120. Instead, thanks to the inclined surface 118 that prepares the snap connectors 800 by giving them the appropriate orientation, the snap connectors 800 will have the desired vertical orientation when entering the channel 120.

Although the output from the drum 110 is a sequence of individually distributed snap connectors, and the final output of the apparatus 100 is also a sequence of individually distributed and snapped snap connectors, there may be an accumulation in between, forming a queue of the snap connectors that were outputted from the drum 110 and wait to be snapped at the output of the apparatus 100 (at the hammering surface 200 described further below). Preferably, the channel 120 should have a length which is sufficient to receive and retain a plurality of snap connectors, individually queued one above the other in the channel 120 and forming such an intermediate queue. When a given snap connector 800 falls into the channel 120, it reaches the bottom thereof, or it reaches the top snap connector in the pile or queue of accumulated snap connectors, all individually piled up over the preceding one and waiting to be individually snapped in the same order they were outputted from the drum 110.

According to an embodiment, there is provided a sensor to detect that the queue of snap connectors 800 within the channel 120 has reached a given, predetermined height (i.e., a maximum threshold). The sensor should be connected to a controller which stops the drum 110 to stop the entry of the snap connectors and pause the accumulation thereof in the channel 120.

Figure 10:
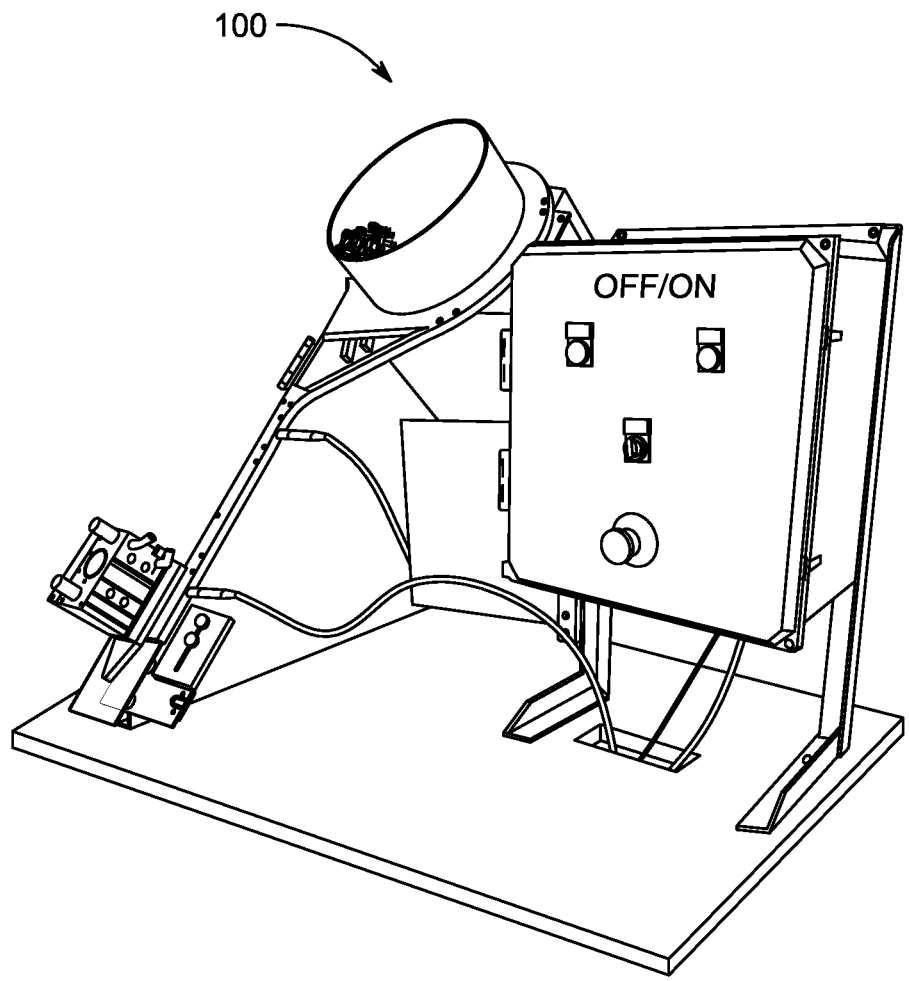
FIG. 10 is another picture illustrating the apparatus of FIG. 9.
Figure 11:
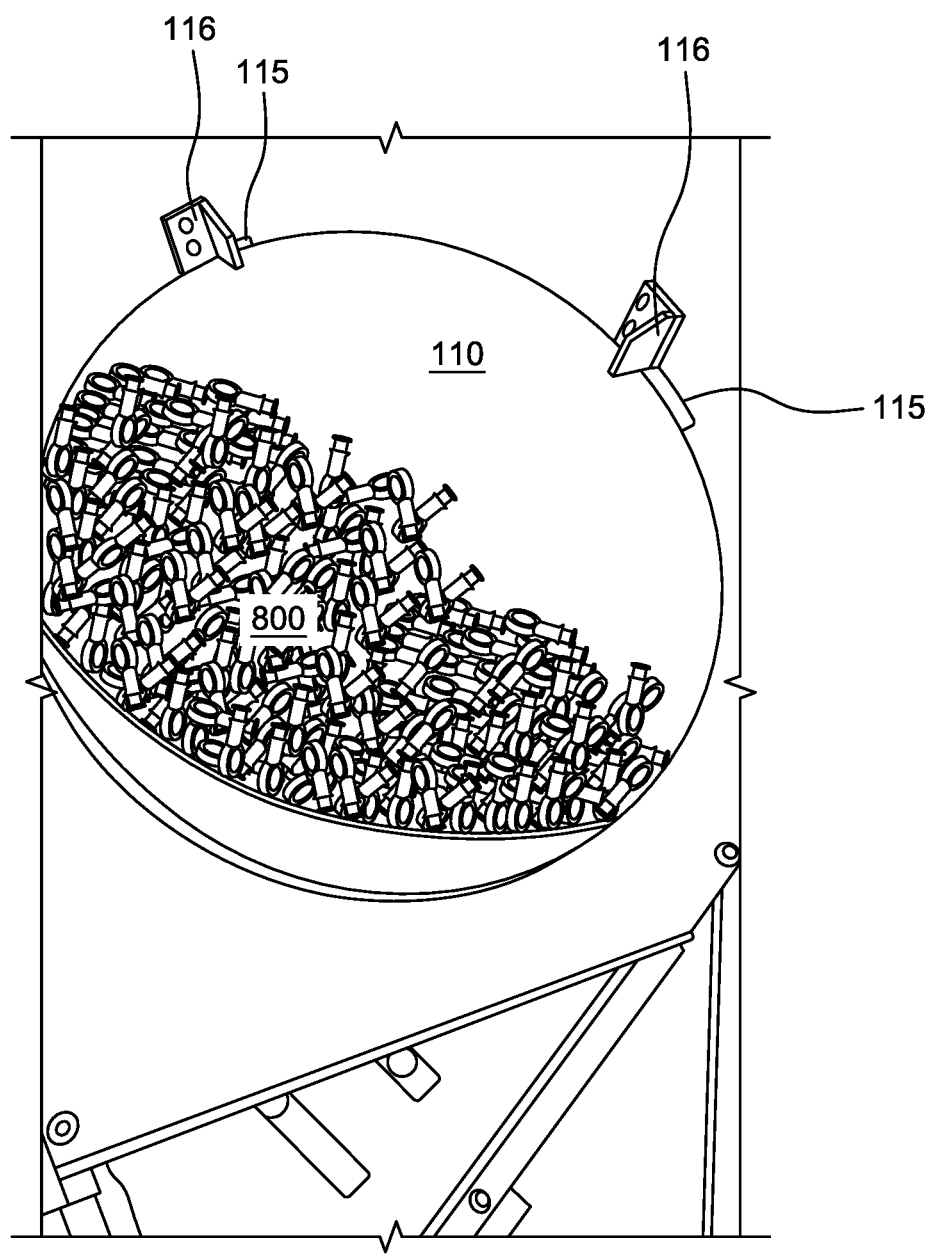
FIG. 11 is a picture illustrating a drum of the apparatus in operation, according to an exemplary embodiment of the invention.
Figure 12:
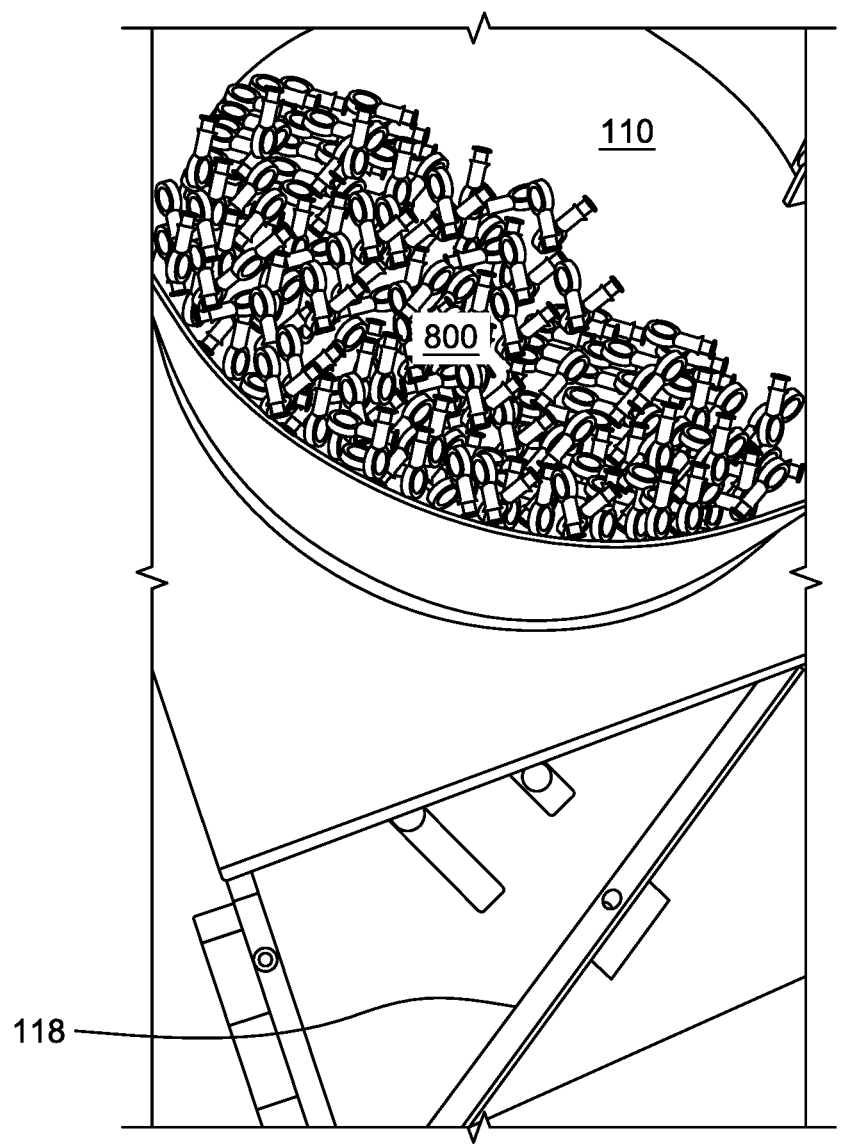
FIG. 12 is a picture illustrating the drum of FIG. 11 ejecting a snap connector toward the channel, according to an exemplary embodiment of the invention.
Figure 13:
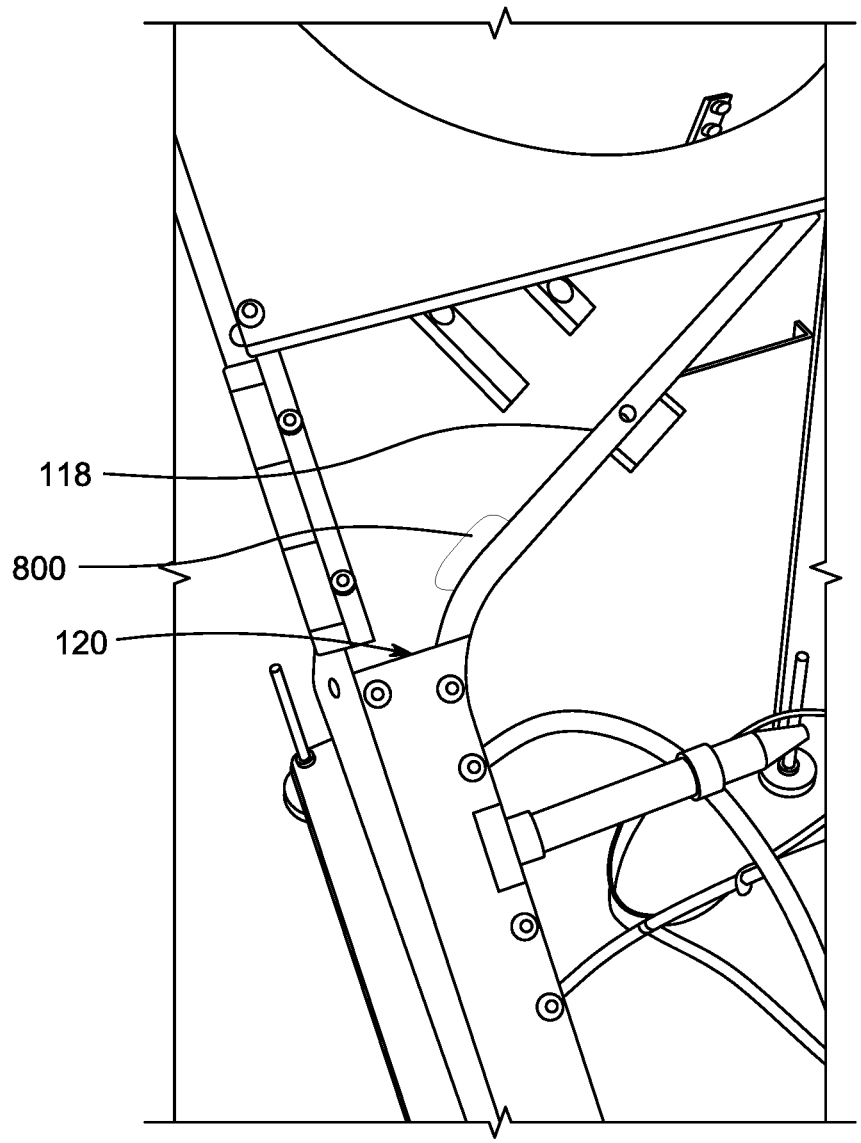
FIG. 13 is a picture illustrating the apparatus with the drum of FIG. 11, with a snap connector sliding toward the entry of the channel, according to an exemplary embodiment of the invention.

According to another embodiment, the operation of the drum 110 may be manual, driven by a switch (e.g., based on the on/off button as shown in FIG. 10), or based on the use of a timer.

While the apparatus is operated, snap connectors at a bottom of the channel 120 are being distributed away from the channel. Therefore, in a manner which is similar to the method described above, when the queue of snap connectors 800 within the channel 120 has reached a smaller, predetermined height (i.e., a minimum threshold), the controller should, in view of this determination by the sensor, instruct the drum 110 to restart its spinning motion around its own longitudinal rotation axis in order to reload the channel 120 with new snap connectors that individually accumulate therein.

Such a sensor may work by optical means (e.g., an optical sensor located at the minimum height threshold and another one at the maximum height threshold), a camera, electrical means (e.g., electrical contact dependent on the presence or absence of a snap connector at a given location in the channel 120), or mechanical means (e.g., a biasing member which is biased depending on the presence or absence of a snap connector at a given location in the channel 120, or a balance measuring the weight of the column of accumulated snap connectors to assess the height), or any other suitable means for detecting if the height of the column has reached a particular threshold (minimum, maximum) or not.

Figure 8:
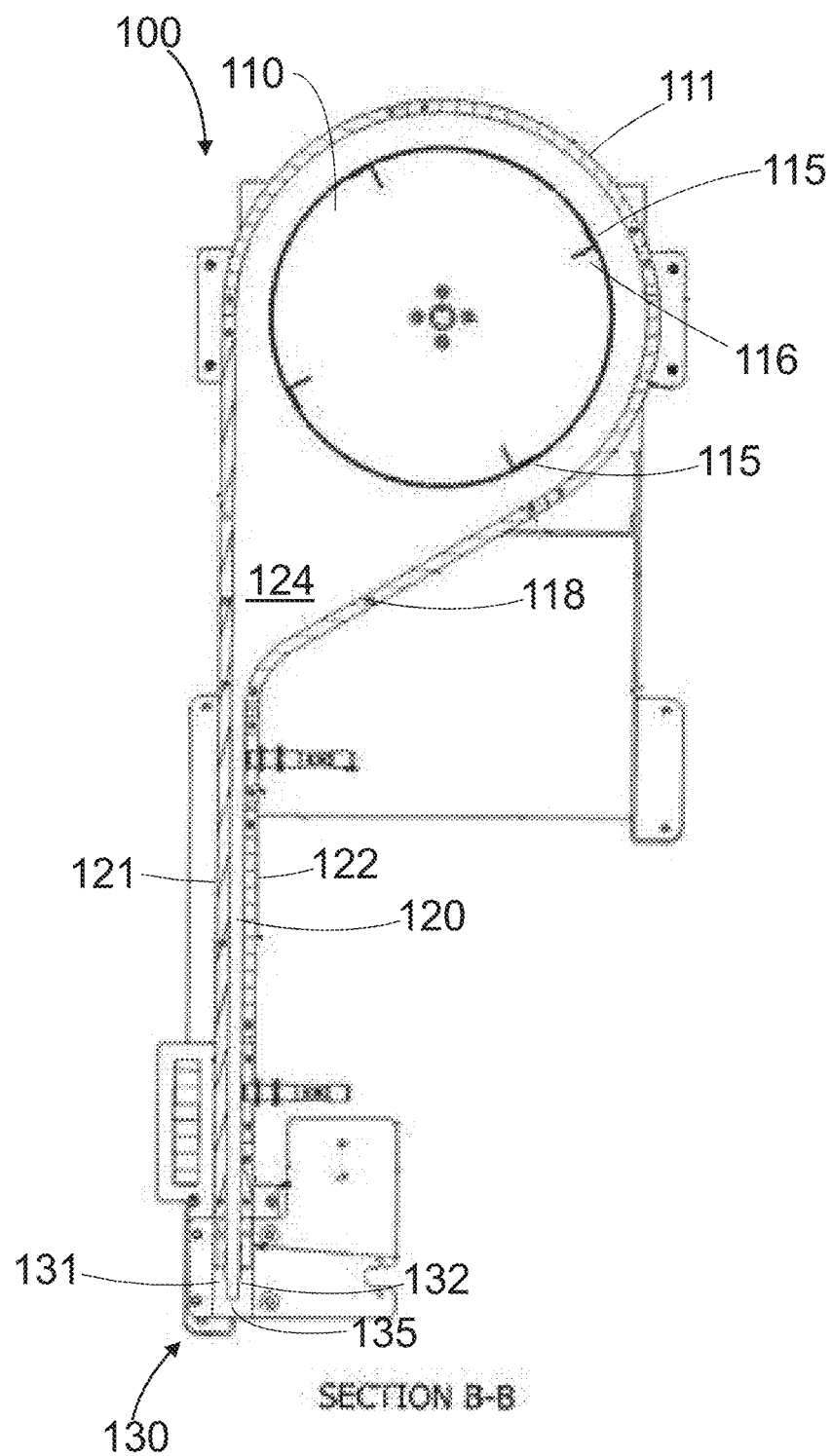
FIG. 8 is a front cross-section, as seen from the front normal axis referred herein as the "front", illustrating the apparatus of FIG. 6.
Figure 9:
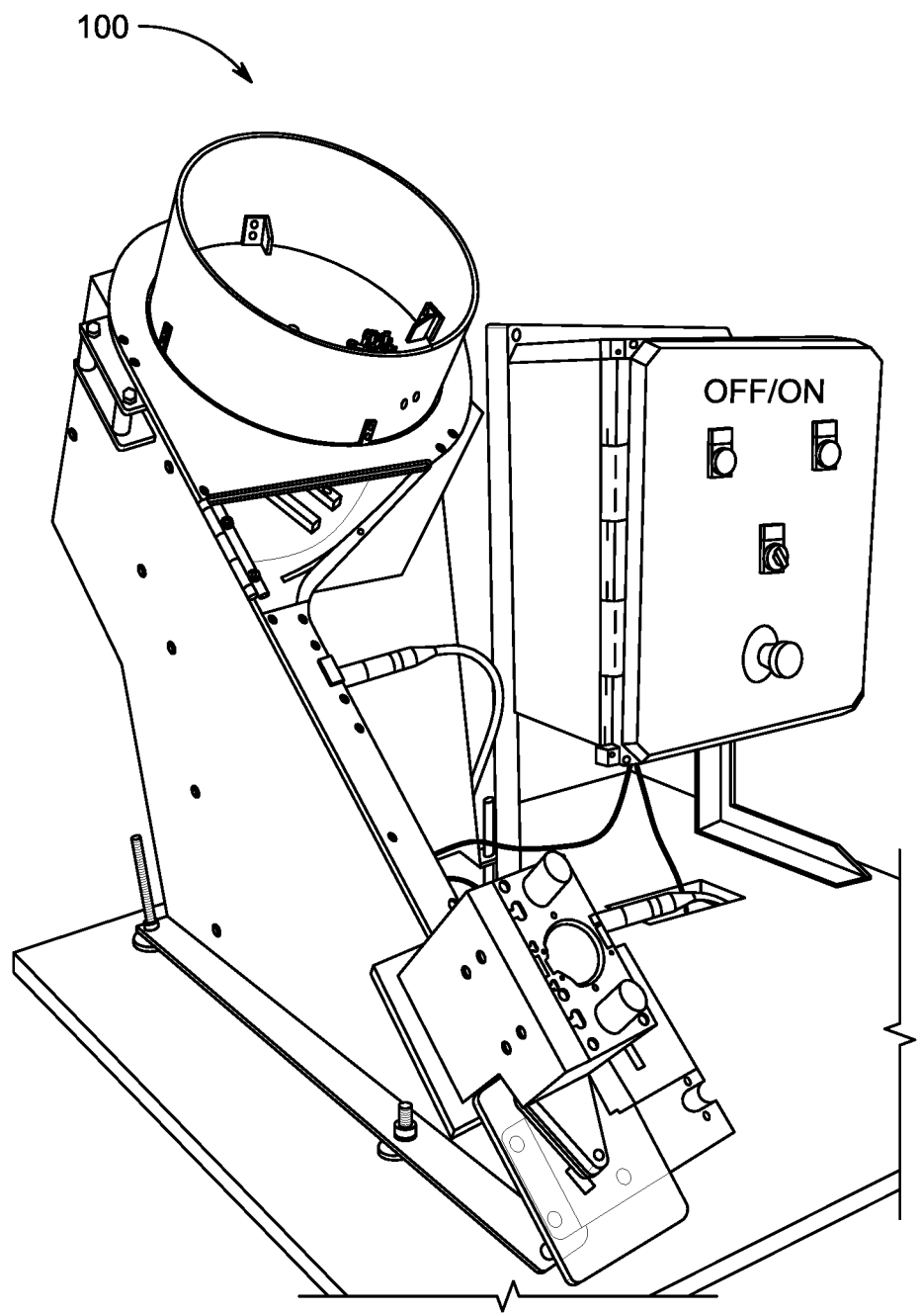
FIG. 9 is a picture illustrating an apparatus for feeding and fixing snap connectors, according to an exemplary embodiment of the invention.
Figure 14:
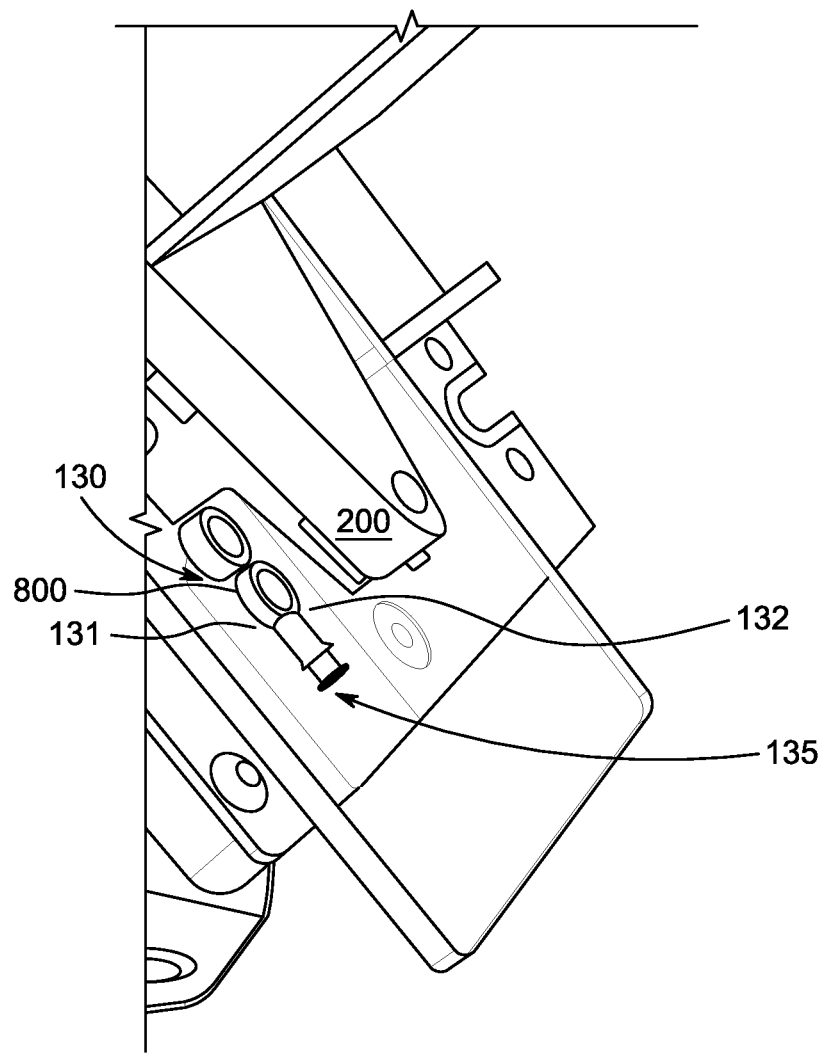
FIG. 14 is a picture illustrating a snap connector lying in the receptacle at the bottom of the channel and ready to be snapped, according to an exemplary embodiment of the invention.

At a bottom end of the channel, there is provided a receptacle 130 that can receive one, and only one, snap connector 800, as shown in FIGS. 8 and 14. To ensure that only one snap connector can be received at a time, and avoid that more than one are received, the shape of the receptacle comprises shoulders 131, 132 forming a neck 135. According to an embodiment, the shoulders 131, 132 correspond to the bottom of the left side wall 121, right side wall 122, which are deformed inwardly to get closer to each other, effectively narrowing the channel 120. Downstream of the shoulders, the channel 120 reduces to a neck 135.

As mentioned above with respect to the restriction of the orientation of the snap connector (which needs to be vertical), when the snap connector 800 falls into the channel 120, it is either located with the snap member 830 downwardly, or upwardly, depending on the direction according to which it entered the channel 120. It remains in this vertical orientation during the whole descent from the opening 115 to the receptable 130.

If the snap connector 800 is provided with the snap member 830 first, it will abut onto the shoulders 121, 122, and the neck 135 will simply not be used.

The only other alternative is if the snap connector 800 is provided with the elongated portion 810 first. In that case, when the elongated portion 810 reaches the bottom under the effect of gravity, the elongated portion 810 will be directed into the neck 135, which has a width which is sufficient to receive the width of the elongated portion 810 (including the wheel 820). If the snap connector 800 is a bit off the vertical, which is possible within the constraints of the right and left walls 121, then the elongated portion 810 may fall onto one of the shoulders 121. The curved nature of the shoulders 121, 122 (i.e., with a slope toward the center of the channel 120 and therefore toward the neck 135) should ensure that under the own weight of the snap connectors (and especially under the weight of the column of snap connectors above the one in the bottom), it will slip and slide on the surface of the one of the shoulders 121, 122, and be brought into the neck 135 into which it will fall, with the elongated portion 810 (including the wheel 820) penetrating into the neck 135. Again, in that case, the downward movement will be stopped by the snap member 830 abutting onto the shoulders 121, 122. In all cases (wheel 820 at the top or at the bottom of the incoming snap connector 800), the snap member 830 ends up abutting onto the shoulders 121, 122 and is ready for snapping while being at this particular, dedicated location.

As mentioned above, the shoulders 131, 132 of the receptacle 130 may be the lowermost extensions of the right and left walls 121, 122. Alternatively, they can be separate members which are advantageously located right below the right and left walls 121, 122.

The receptacle 130 should also comprise an extension of the rear wall 122. The rear wall 122 defining the back of the channel 120 does not need to extend behind the neck 135. However, it should extend long enough downwardly to reach the region defined between the shoulders 131, 132. In other words, when a snap connector 800 has reached the bottom of the channel 120 and is in the receptacle 130, the snap member 830 abutting onto the shoulders 131, 132 should have the rear wall 124 (or any other rear wall which does not necessarily needs to be contiguous with the rear wall 124 of the channel 120) forming the back of the snap member 130.

The purpose of the rear wall behind the snap member 830 is to form a surface that retains the snap member 830 when it will undergo a hitting movement from the front when the snapping is performed between the snap member 830 and a corresponding rivet on a piece of fabric such as a curtain (in particular, a ripplefold curtain).

In this case, the front wall 123 needs not to extend over the snap member 130 when it is abutting onto the shoulders 131, 132. The front wall 123 should therefore stop above the receptacle 130.

The result is that the lowermost snap connector is being well sit onto the shoulders with the elongated member indifferently extending above the snap member 830, either into the channel 120, or below, into the neck 135 (but nowhere else), and is also supported from the back while offering its front portion to the outside. The front portion of the snap member 130 is therefore ready to undergo a snap-fit connection which uses a significant force.

Figure 6:
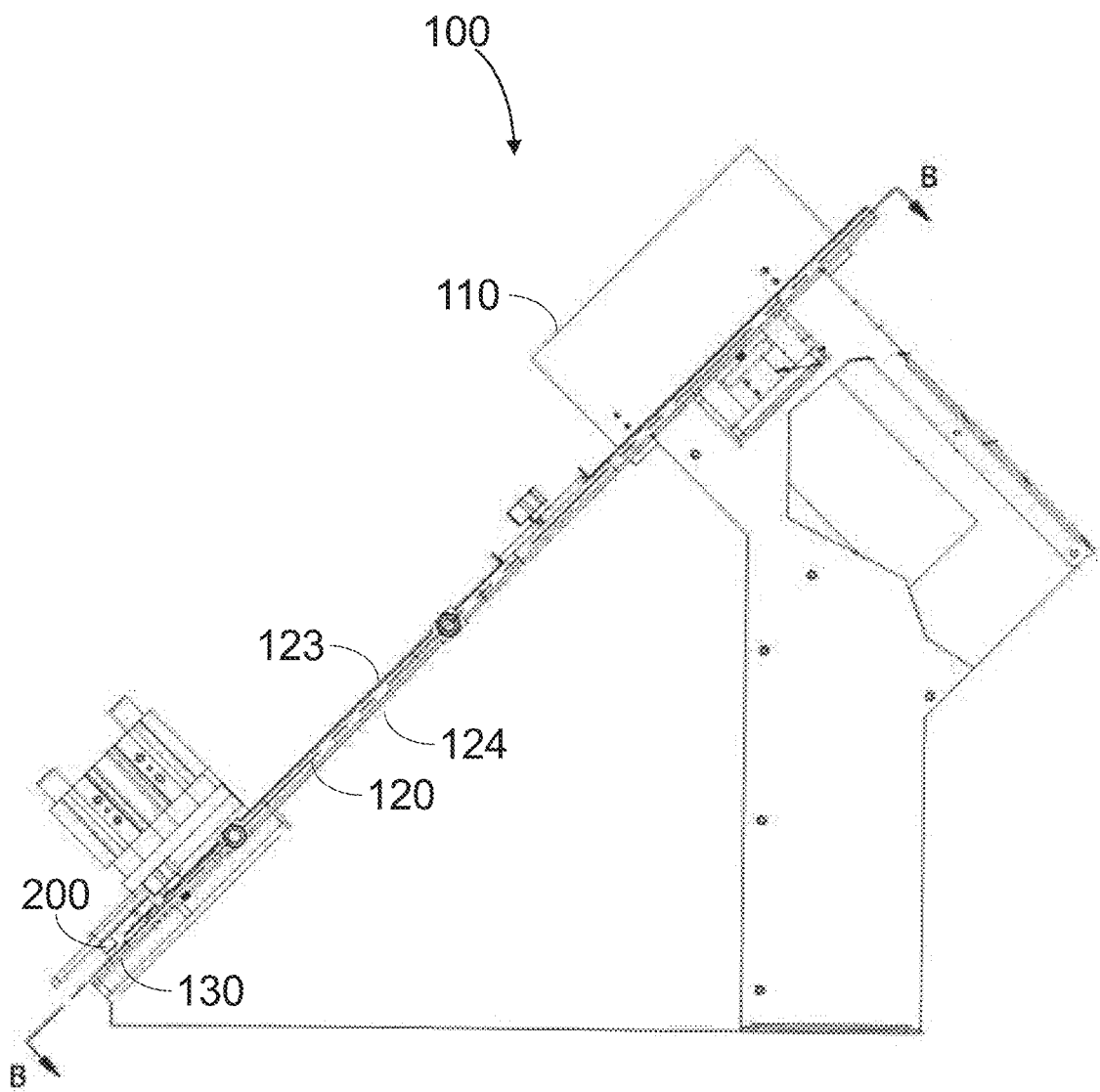
FIG. 6 is a side view illustrating an apparatus for feeding and fixing snap connectors, according to an exemplary embodiment of the invention.
Figure 7:
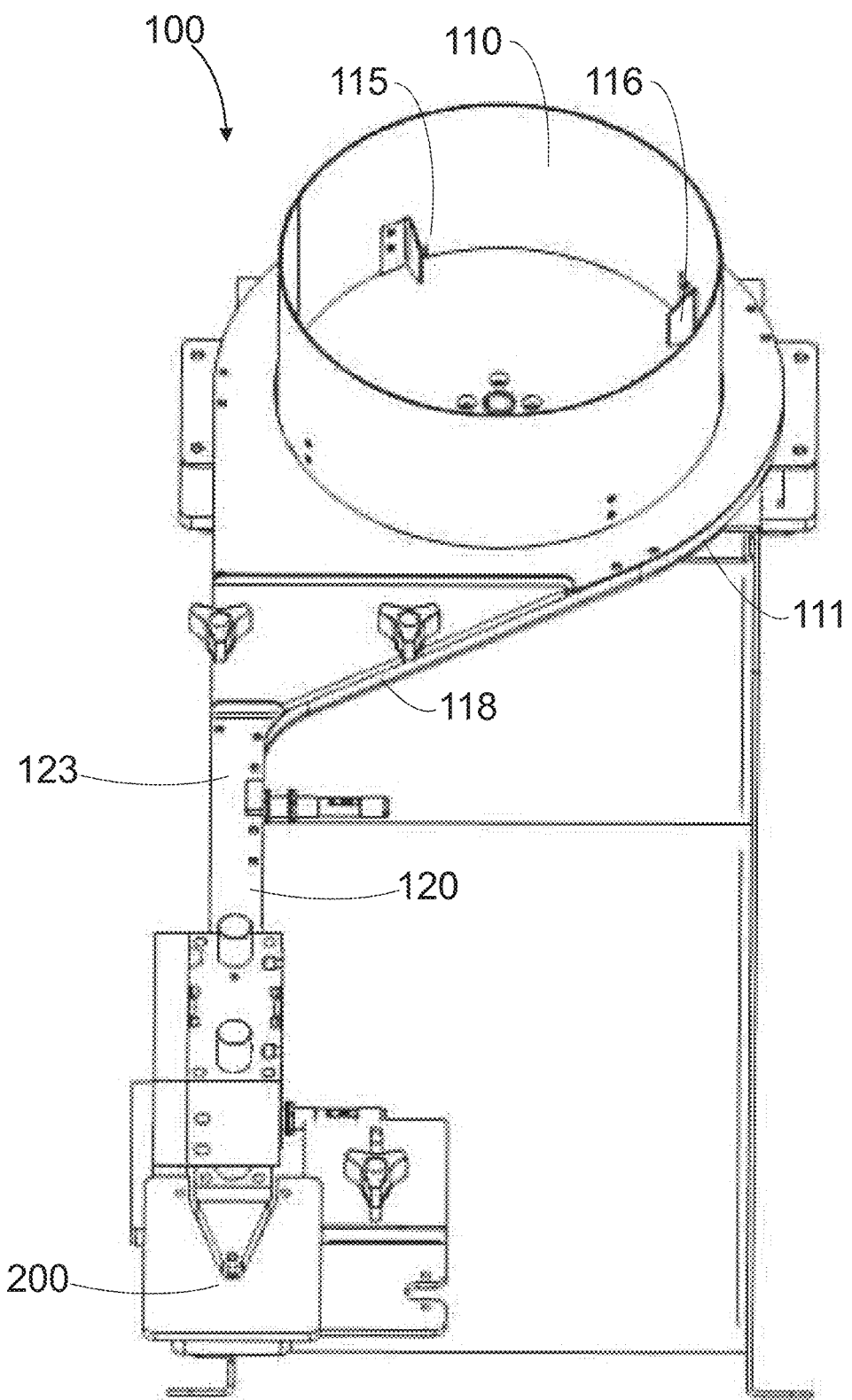
FIG. 7 is a horizontal front view illustrating the apparatus of FIG. 6.

The term "vertical" applied to the orientation of the snap connectors 800 inside the channel 120 should be interpreted as being in the same alignment as the channel 120 such that the line of motion is aligned with the longitudinal axis of the elongated portion 810. However, as mentioned above, the channel 120 may be not perfectly vertical. In fact, the channel 120 may be substantially inclined, as shown in FIG. 6, as long as there is a significant vertical component to ensure that the snap connectors 800 can fall under the effect of gravity. The axis defining the front, perpendicular to the longitudinal axis of the bottom of the channel 120, may therefore be horizontal or be away from the horizon, e.g., it may have a vertical component too, as shown in FIG. 6.

According to an embodiment, in front of the front portion of the exposed snap member 830 in the receptacle 130, there is provided a hammer of hammering surface 200. The hammering surface 200 may be a hammer, a plate or any other solid, rigid surface capable of being moved and hard enough to provoke the snap-fit connection between the snap member 830 (male or female) and any other cooperating snap member (respectively, female or male) provided in-between in the suitable position. The suitable position of the cooperating snap member is above the snap member 830 (i.e., not away from the snap member 830) and in the proper orientation for the snap-fit connection.

According to an embodiment, the cooperating snap member is a rivet already riveted onto a piece of textile, such as on a curtain or on a band of textile.

Figure 20:
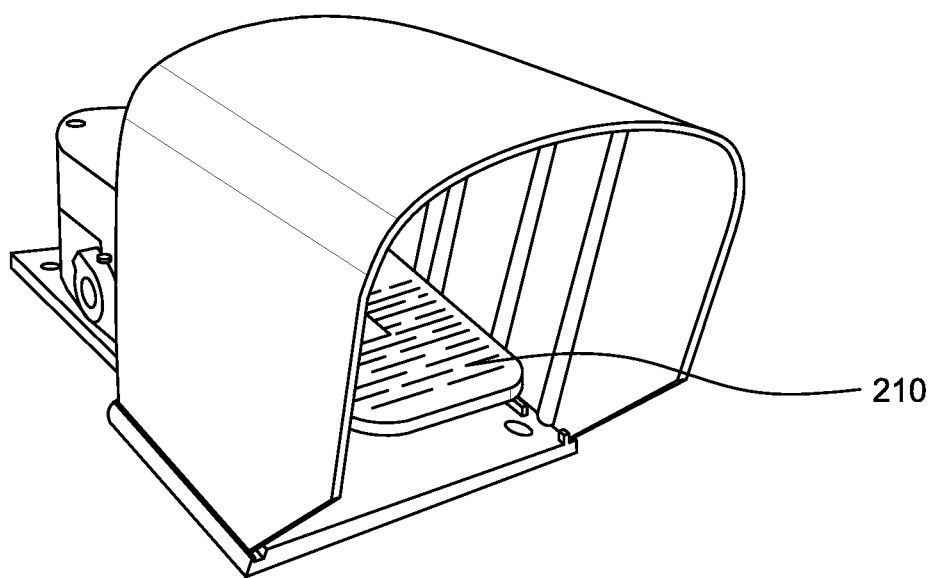
FIG. 20 is a picture illustrating the pedal for triggering the hammering surface, according to an exemplary embodiment of the invention.

According to an embodiment, there is provided a pedal 210, as shown in FIG. 20, or any other type of trigger (wired or wireless), such as a button, a handle, or a sensor of any type, under the action of which the hammering surface 200 is operated.

The operation of the hammering surface 200 comprises the actuation of mechanism which pushes the hammering surface 200 linearly toward the receptacle 130. According to an embodiment, the movement is very fast, and does not need to reach the receptacle because the intended effect is to snap any cooperating snap member located above the snap member 830. The movement should be a punching member and the hammering surface 200 only needs to reach the top surface of the cooperating snap member located above the snap member 830, plus the distance removed when it enters in a snap-fit connection with the snap member 830 in the receptacle 130.

The translation movement of the hammering surface 200 is made along an axis which is normal to the surface of the snapping member 830, corresponding to the axis which is perpendicular to both the longitudinal axis of the channel (the axis along which is it aligned at the end thereof) and the axis along which the width of the channel is measured. In other words, the hammering surface 200 is parallel to the general orientation of the receptacle 130 (which is the same as the general orientation of the snap connector 800 lying therein).

According to an embodiment, an engine with a source of energy (electrical, fuel, etc.) drives the actuation of the hammering surface 299. According to an embodiment, a simple actuator connected to a trigger (such as the pedal 210) may be enough. According to another embodiment, the trigger (such as the pedal 210) may transfer the mechanical energy to the actuator for the hammering surface 200.

According to an embodiment, the rivets are already installed at periodic locations on the curtain or on a band of textile. Each one of the rivets is the cooperating snap member corresponding to each one of the different snap members 830 being successively and individually presented in the receptacle 130. The operator may therefore displace the curtain or the band of textile to align the corresponding cooperating snap member (e.g., rivet) right in front of the snap member 830 being presented in the receptacle 130. Once the placement is made, the operator may trigger the hammering surface 200 (e.g., with a pedal 210). The hammer or hammering surface 200 is thereby actuated in a movement which is normal (i.e., perpendicular) to the snap member 830, thereby snapping the rivet onto the snap member 830 in a snap-fit relationship. The operator may then displace the newly formed pair of the rivet and snap connector 800, thereby freeing the receptacle 830. The column of snap connectors will then fall downwardly to present a new snap connector 800 in the receptacle 130, and the operator may then repeat the alignment with a new corresponding pair of snap member 820 and corresponding cooperating snap member (e.g., rivet), and perform the snapping by hammering them while they are aligned in front of each other.

Figure 15:
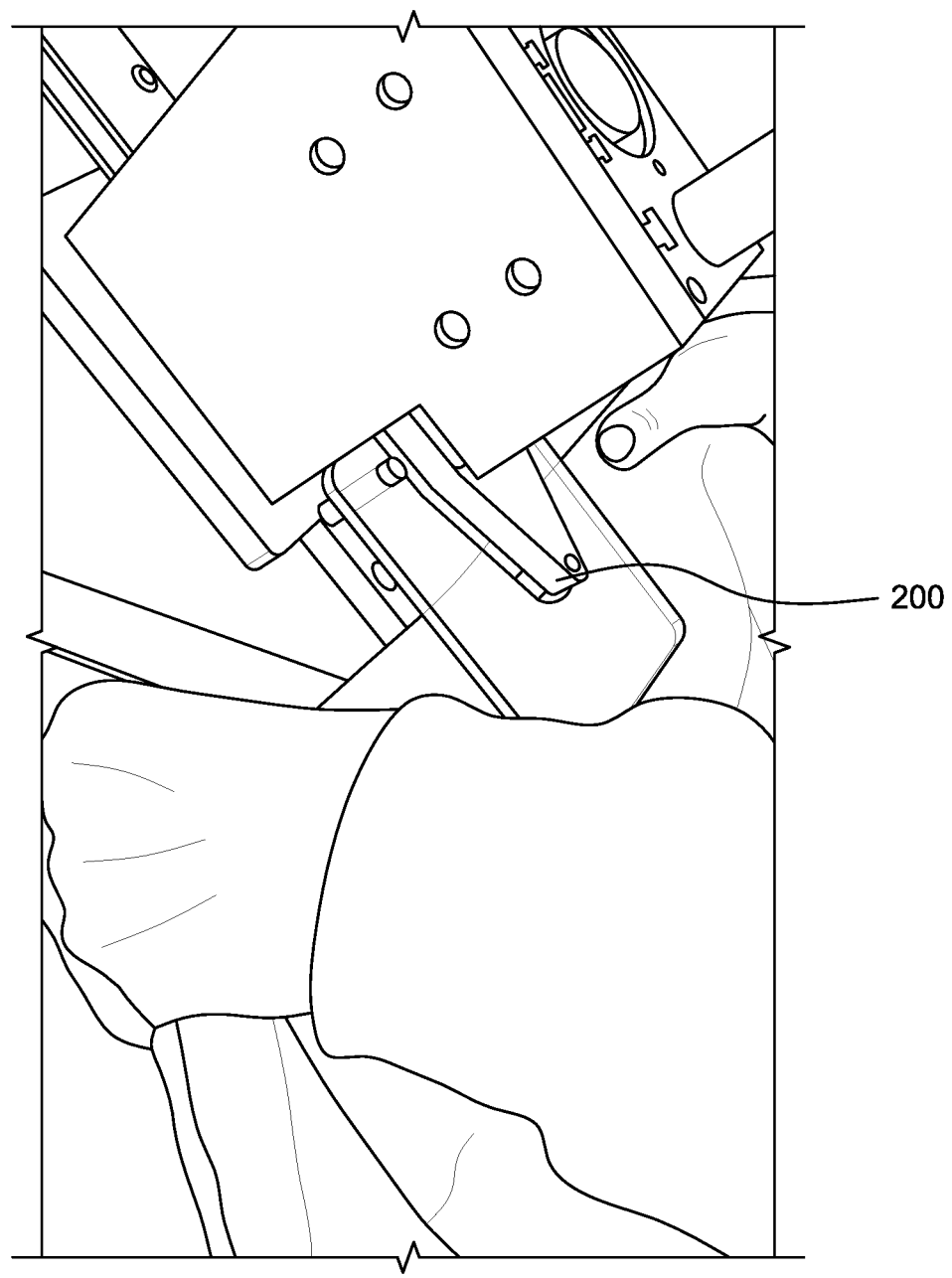
FIG. 15 is a picture illustrating an operator placing a band of textile with a rivet in alignment with the snap connector of FIG. 14, according to an exemplary embodiment of the invention.
Figure 16:
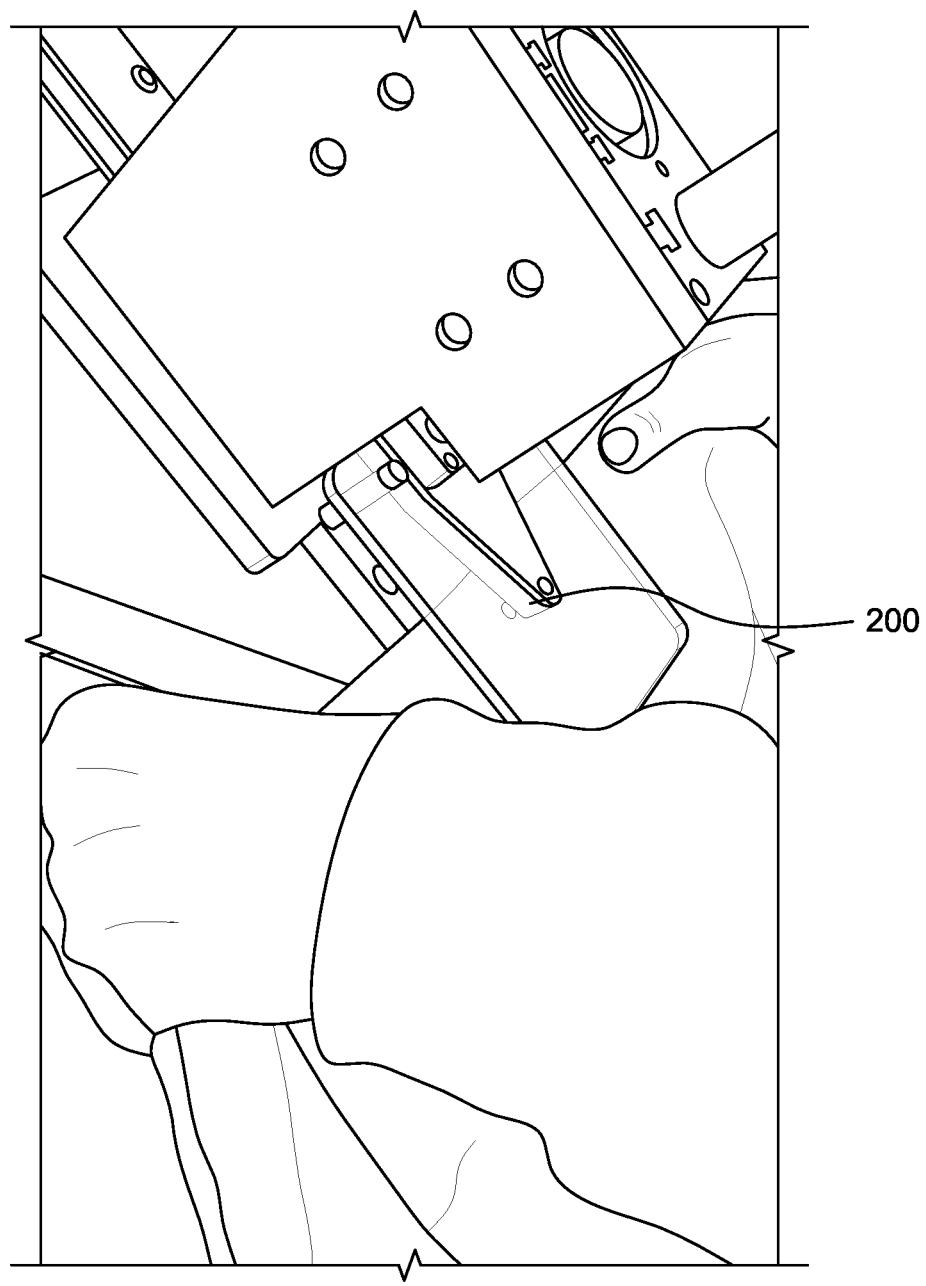
FIG. 16 is a picture illustrating the snapping operation of the rivet with the snap connector as aligned in FIG. 15, according to an exemplary embodiment of the invention.
Figure 17:
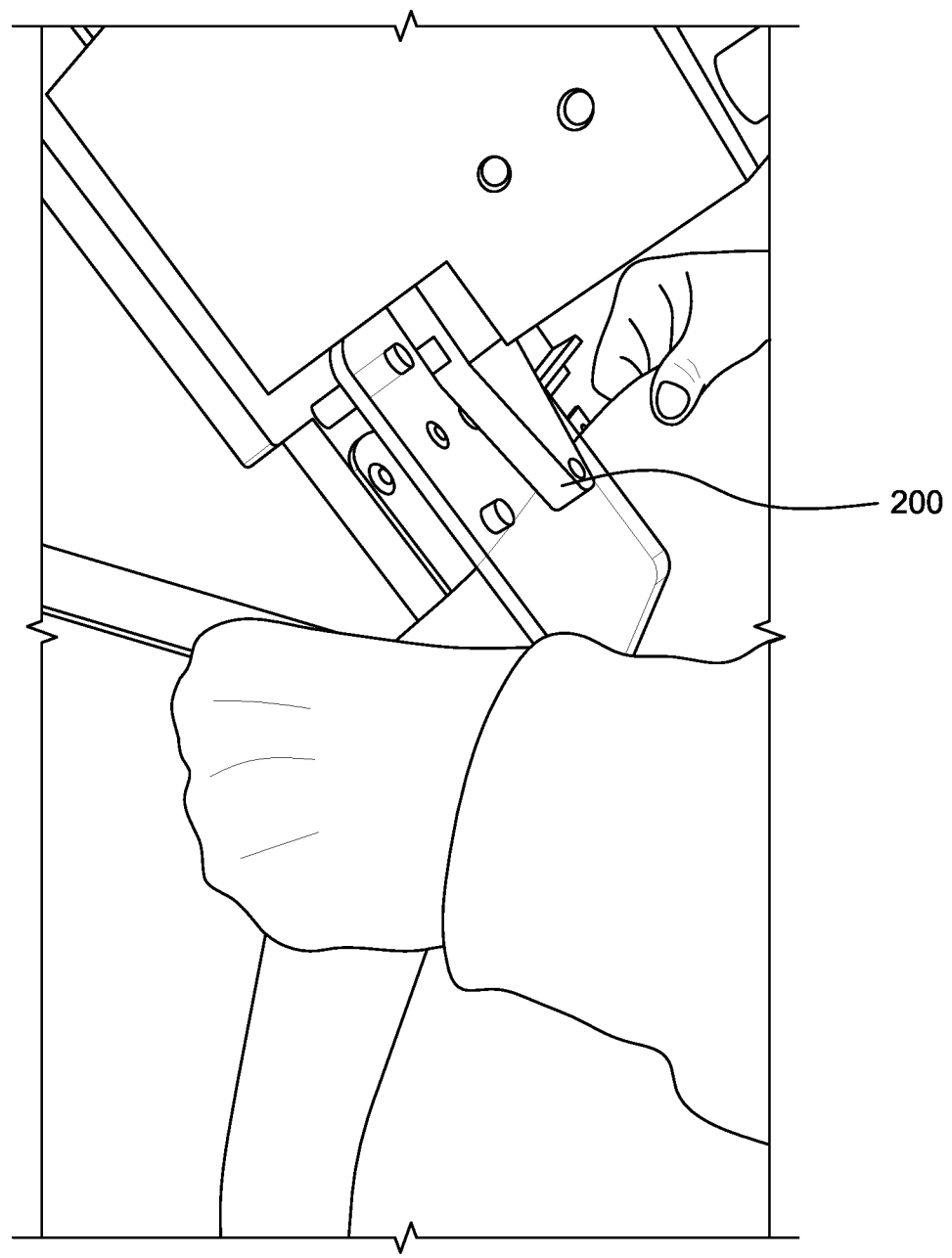
FIG. 17 is a picture illustrating the termination of the snapping operation of FIG. 16, according to an exemplary embodiment of the invention.
Figure 18:
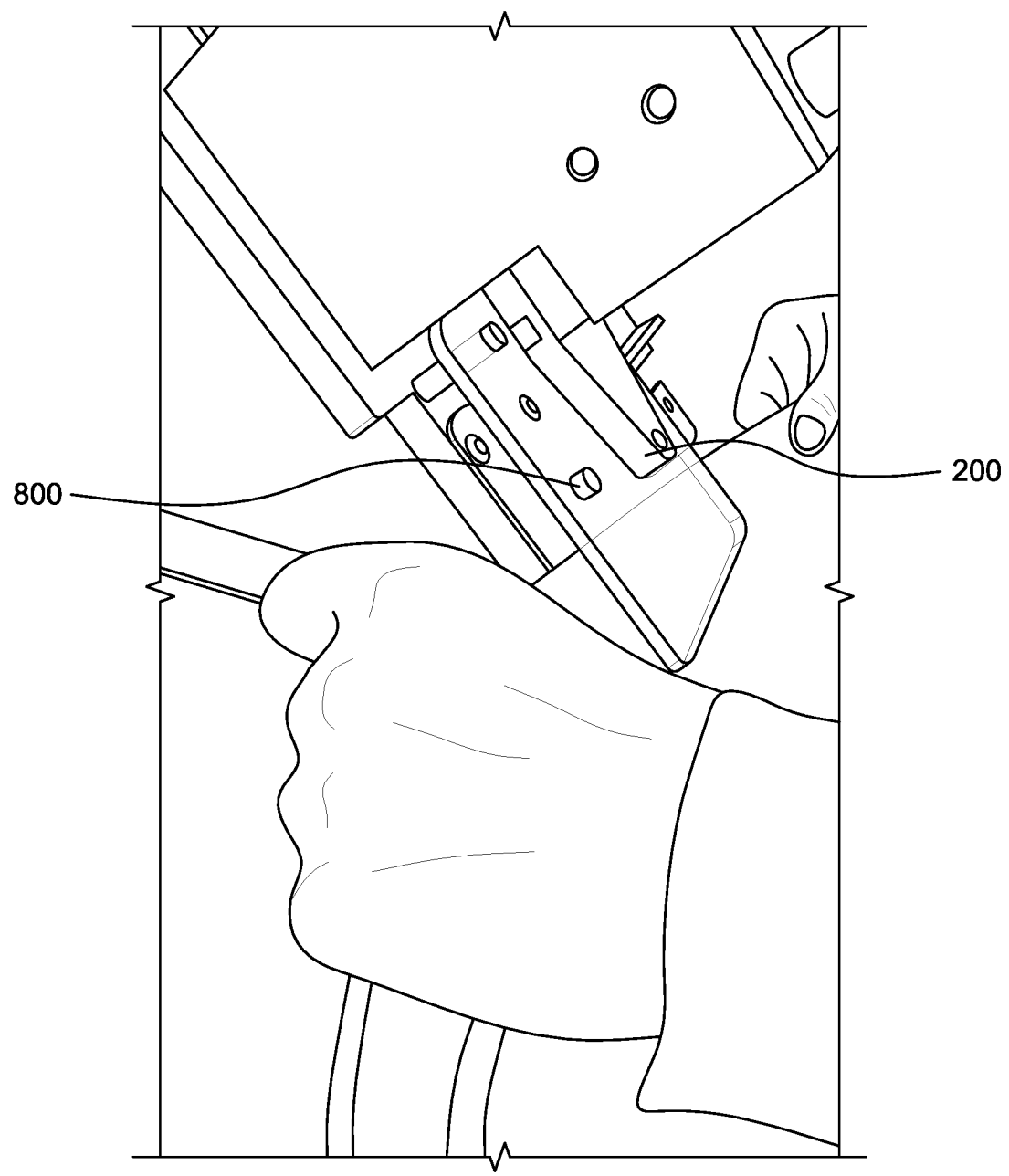
FIG. 18 is a picture illustrating the translation of the band of textile to repeat the snapping with a new rivet, after completion of the previous snapping shown in FIG. 17, according to an exemplary embodiment of the invention.
Figure 19:
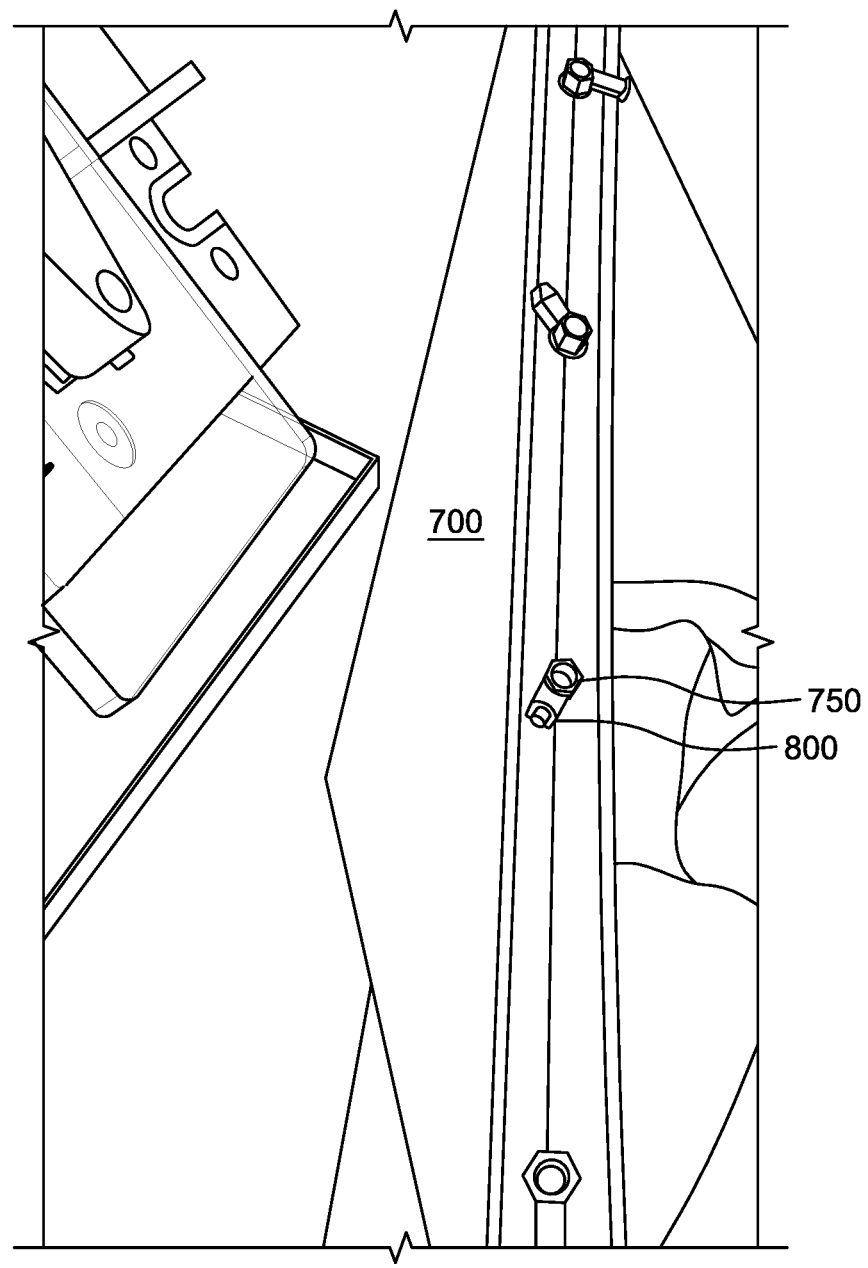
FIG. 19 is a picture illustrating the result of the band of textile comprising rivets snapped with corresponding snap connectors using the apparatus, according to an exemplary embodiment of the invention.

FIG. 14 shows a snap connector lying in the receptacle at the bottom of the channel and ready to be snapped, according to an exemplary embodiment of the invention. FIG. 15 shows an operator placing a band of textile with a rivet in alignment with the snap connector of FIG. 14. FIG. 16 shows the snapping operation of the rivet with the snap connector as aligned in FIG. 15. FIG. 17 shows the completion of the snapping operation of FIG. 16. FIG. 18 shows the translation of the band of textile to repeat the snapping with a new rivet, after completion of the previous snapping shown in FIG. 17.

FIG. 18 is a picture illustrating the result of the band of textile 700 comprising rivets 750 snapped with corresponding snap connectors 800 using the apparatus 100, according to an exemplary embodiment of the invention.

Alternatively, the displacement of the band of textile comprising the plurality of cooperating snap members (such as the portion of curtains comprising the rivets) can be automated. This can be made by providing the band of textile on a conveyor or any other type of mechanism providing a translation of the band of textile. In this case, the cooperating snap members need to be located at precisely periodic locations to be displaced with the right distance for each iteration of the snapping with the snap connector 800 being fed in the receptacle. Otherwise, a sensor or an optical equipment may be used to detect the required distance of translation to be applied to the band of textile to reach the next rivet. and instruct the translation mechanism to operate this exact translation.

Figure 21:
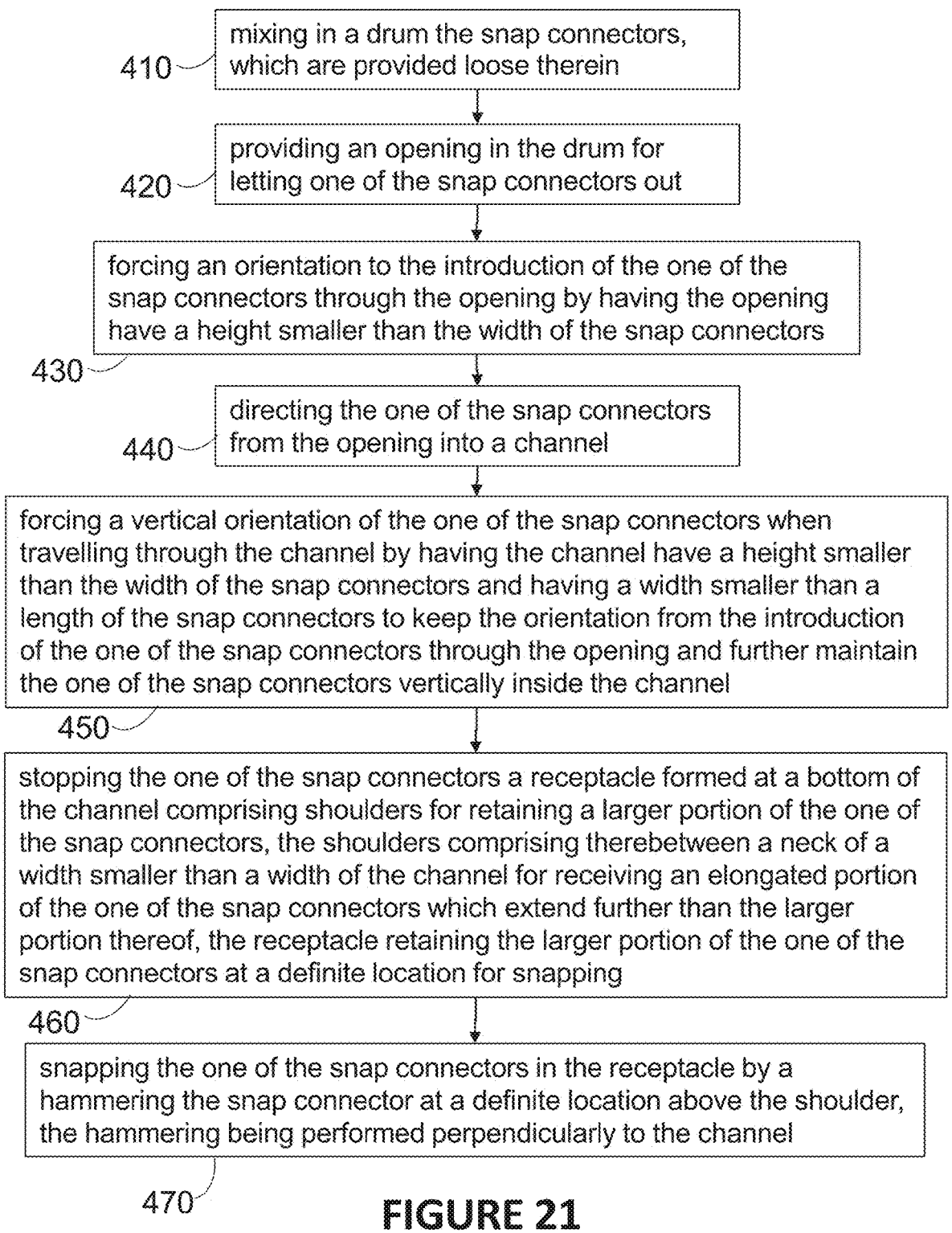
FIG. 21 is a flowchart illustrating a method for feeding and fixing snap connectors of a ripple fold curtain system, according to an exemplary embodiment of the invention.

FIG. 21 is a flowchart illustrating a method for feeding and fixing snap connectors of a ripple fold curtain system, each of the snap connectors having a length, a width smaller than the length, and a thickness smaller than the width, the method comprising the following steps:

Step 410: mixing in a drum the snap connectors, which are provided loose therein;

Step 420: providing an opening in the drum for letting one of the snap connectors out;

Step 430: forcing an orientation to the introduction of the one of the snap connectors through the opening by having the opening have a height smaller than the width of the snap connectors;

Step 440: directing the one of the snap connectors from the opening into a channel;

Step 450: forcing a vertical orientation, or general longitudinal orientation aligned with motion, of the one of the snap connectors when travelling through the channel by having the channel have a height smaller than the width of the snap connectors and having a width smaller than a length of the snap connectors to keep the orientation from the introduction of the one of the snap connectors through the opening and further maintain the one of the snap connectors vertically inside the channel; and Step 460: stopping the one of the snap connectors a receptacle formed at a bottom of the channel comprising shoulders for retaining a larger portion of the one of the snap connectors, the shoulders comprising therebetween a neck of a width smaller than a width of the channel for receiving an elongated portion of the one of the snap connectors which extend further than the larger portion thereof, the receptacle retaining the larger portion of the one of the snap connectors at a definite location for snapping; and Step 470: snapping the one of the snap connectors in the receptacle by a hammering the snap connector at a definite location above the shoulder, the hammering being performed perpendicularly to the snap connector lying in the receptacle (or perpendicularly to the channel).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An apparatus for feeding and fixing snap connectors of a ripple fold curtain system, each of the snap connectors having a length, a width smaller than the length, and a thickness smaller than the width, the apparatus comprising:
   a drum for receiving the snap connectors, which are loose therein, the drum being rotatable for mixing the snap connectors and comprising an opening for letting one of the snap connectors out, the opening having a height smaller than the width of the snap connectors to force an orientation to the introduction of the one of the snap connectors through the opening, the drum being a cylinder and the opening being formed on a circumference of the cylinder, the opening having a width and a height which are smaller than the length of the snap connector and respectively larger than the width and the thickness of the snap connector; and
   a receptacle receiving the one of the snap connectors introduced through the opening, the receptacle comprising shoulders for retaining a larger portion of the one of the snap connectors, the shoulders comprising therebetween a neck of a width smaller than the larger portion of the one of the snap connectors for receiving an elongated portion of the one of the snap connectors which extend further than the larger portion thereof, the receptacle retaining the larger portion of the one of the snap connectors at a definite location for snapping, and a wall on the circumference of the cylinder which is immediately adjacent the opening, wherein the wall has a radial depth toward an inside center of the drum which is between one and three times the length of the snap connector, and a longitudinal height along a cylindrical axis-of-rotation direction of the drum which is between one and three times the length of a snap connector, and greater than the height of the opening.

2. The apparatus of claim 1, further comprising:
   a channel having a height smaller than the width of the snap connectors and having a width smaller than the length of the snap connectors to keep the orientation from the introduction of the one of the snap connectors through the opening and further maintain the one of the snap connectors vertically inside the channel.

3. The apparatus of claim 2, wherein the receptacle is formed at a bottom of the channel.

4. The apparatus of claim 2, wherein the channel is long enough for containing a plurality of snap connectors forming a queue, further comprising a sensor for detecting a length of a queue and instructing an operation of the drum based on the sensor detecting the length of the queue.

5. The apparatus of claim 1, further comprising a hammering surface opposed to the receptacle, the hammering surface being parallel to a surface of the receptacle to perform hammering perpendicularly to the snap connector therein.

6. A method for feeding and fixing snap connectors of a ripple fold curtain system, each of the snap connectors having a length, a width smaller than the length, and a thickness smaller than the width, the method comprising the steps of:
   mixing in a drum the snap connectors, which are provided loose therein;
   providing an opening in the drum for letting one of the snap connectors out;
   forcing an orientation to the introduction of the one of the snap connectors through the opening by having the opening have a height smaller than the width of the snap connectors, the drum being a cylinder and the opening being formed on a circumference of the cylinder, the opening having a width and a height which are smaller than the length of the snap connector and respectively larger than the width and the thickness of the snap connector, and a wall on the circumference of the cylinder being immediately adjacent the opening, the wall having a radial depth toward an inside center of the drum which is between one and three times the length of the snap connector, and a longitudinal height along a cylindrical axis-of-rotation direction of the drum being between one and three times the length of a snap connector, and greater than the height of the opening; and
   receiving the one of the snap connectors in the orientation at a receptacle comprising shoulders for retaining a larger portion of the one of the snap connectors, the receptacle retaining the larger portion of the one of the snap connectors at a definite location for snapping and maintaining the orientation.

7. The method of claim 6, further comprising:
   directing the one of the snap connectors from the opening into a channel, wherein the receptacle is formed at a bottom of the channel.

8. The method of claim 7, wherein the shoulders comprise therebetween a neck of a width smaller than a width of the channel for receiving an elongated portion of the one of the snap connectors which extend further than the larger portion thereof.

9. The method of claim 7, further comprising:
   forcing an orientation of the one of the snap connectors aligned with a motion of the one of the snap connectors when travelling through the channel by having the channel have a height smaller than the width of the snap connectors and having a width smaller than a length of the snap connectors to keep the orientation from the introduction of the one of the snap connectors through the opening and further maintain the one of the snap connectors vertically inside the channel.

10. The method of claim 7, further comprising queuing a plurality of snap connectors in the channel, monitoring a queue and operating the drum based on the monitoring of the queue.

11. The method of claim 7, further comprising:
   snapping the one of the snap connectors in the receptacle by hammering the snap connector at a definite location above the shoulders, the hammering being performed perpendicularly to the channel.

\* \* \* \* \*